(12) United States Patent
Chang

(10) Patent No.: US 9,665,231 B2
(45) Date of Patent: May 30, 2017

(54) DETECTING METHOD AND DEVICE FOR TOUCH SCREEN

(71) Applicant: EGALAX_EMPIA TECHNOLOGY INC., Taipei (TW)

(72) Inventor: Chin-Fu Chang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 426 days.

(21) Appl. No.: 13/896,487

(22) Filed: May 17, 2013

(65) Prior Publication Data

US 2013/0321331 A1   Dec. 5, 2013

Related U.S. Application Data

(63) Continuation-in-part of application No. 13/545,291, filed on Jul. 10, 2012, now Pat. No. 9,024,911.

(60) Provisional application No. 61/676,354, filed on Jul. 27, 2012, provisional application No. 61/648,710, filed on May 18, 2012.

(51) Int. Cl.
*G06F 3/047* (2006.01)
*G06F 3/041* (2006.01)
*G06F 3/044* (2006.01)

(52) U.S. Cl.
CPC .............. *G06F 3/047* (2013.01); *G06F 3/044* (2013.01); *G06F 3/0418* (2013.01)

(58) Field of Classification Search
CPC ....... G06F 3/0418; G06F 3/0416; G06F 3/044
See application file for complete search history.

(56) References Cited

U.S. PATENT DOCUMENTS

| | | | | |
|---|---|---|---|---|
| 2003/0051927 A1* | 3/2003 | Inamori | .................. | G06F 3/045 178/18.01 |
| 2005/0114307 A1* | 5/2005 | Li | ...................... | G06F 17/30457 |
| 2008/0158169 A1* | 7/2008 | O'Connor | ............. | G06F 3/0418 345/173 |
| 2010/0013800 A1* | 1/2010 | Elias | ..................... | G06F 3/0418 345/178 |
| 2010/0259505 A1* | 10/2010 | Chang | ..................... | G06F 3/044 345/174 |
| 2010/0300773 A1* | 12/2010 | Cordeiro | ................. | G06F 3/044 178/18.06 |
| 2011/0242045 A1* | 10/2011 | Park | ...................... | G06F 3/0418 345/174 |
| 2013/0265242 A1* | 10/2013 | Richards | ................. | G06F 3/044 345/173 |
| 2014/0232682 A1* | 8/2014 | Kim | ....................... | G06F 3/044 345/174 |

* cited by examiner

*Primary Examiner* — Quan-Zhen Wang
*Assistant Examiner* — Dong Hui Liang
(74) *Attorney, Agent, or Firm* — WPAT, PC; Justin King; Douglas Hosack

(57) ABSTRACT

One driving electrode or one set of driving electrode of a touch screen are designated as a base electrode or base electrodes. When the base electrode or base electrodes are provided by a driving signal, the detected signal from the sensing electrodes is designated as a level signal. The level signal is used to adjust the detected signal when other non-base electrodes are provided by the driving signal, whereby the detected image from the touch screen can be leveled.

14 Claims, 12 Drawing Sheets

DETECTING METHOD AND DEVICE FOR TOUCH SCREEN

CROSS REFERENCE TO RELATED APPLICATIONS

This application is a continuation in part application of U.S. Non-Provisional application Ser. No. 13/545,291, filed Jul. 10, 2012, which claims the benefit of U.S. Provisional Application No. 61/648,710, filed on May 18, 2012, and this application claims the benefit of U.S. Provisional Application No. 61/676,354, filed on Jul. 27, 2012, and the benefit of U.S. Provisional Application No. 61/648,710, filed on May 18, 2012, which is herein incorporated by reference for all intents and purposes.

BACKGROUND OF THE INVENTION

1. Field of the Invention

The present invention relates to a detecting method and device for touch screens, and more particularly, to a detecting device and method for capacitive touch screens that produces a level image.

2. Description of the Prior Art

A capacitive touch screen determines the locations of touches made by a human body thereon based on changes in detected signals due to its capacitive coupling with the body. When the human touches the screen, noise surrounding the human body also adds to the capacitive coupling between the human body and the capacitive touch screen, and thus causing changes in the detected signals. Moreover, since noise is not constant, it cannot be easily determined. When the signal to noise ratio (S/N ratio) is relatively small, a touch may not be detected, or the location of the touch may not be accurately detected.

In addition, the phase differences between the signals received by the detecting electrodes and the signals which will be provided to the driving electrodes will be resulted because the signals pass through load circuits such as capacitive coupling. When the periods of the driving signals are the same, the signals with different phases will be received at different times. If signals are measured after ignoring the phase differences, the measurements will be disturbed by the different initial phases. If the measurements corresponding to different electrodes are great inconsistent, the determination of the touch position is always incorrect.

Besides, the impedance of the RC circuit, to which the driving signals pass, corresponding to different driving electrodes could be different such that the image values of the touch panel will change roughly when the touch penal is detected in mutual-capacitive coupling.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

Signals passing through RC circuits will be different due to the loads. An objective of the present invention is to set different detecting parameters corresponding to different driving electrodes, and the signals detected based on the detecting parameter of each driving electrode could be approached as possible so as to reach the optimization or the best leveling of the image signals detected by the touch screen.

An objective of the present invention and the solutions for the prior-art problems are achieved by the following technical schemes. A detecting device for touch screen proposed by the present invention includes: a touch screen comprising a plurality of parallel driving electrodes and a plurality of parallel detecting electrodes is provided, wherein the driving electrodes and the detecting electrodes cross each other at intersections; a driving circuit, providing a driving signal to one driving electrode or one set of driving electrodes, wherein one driving electrode or one set of driving electrodes are designated as one base electrode or one set of base electrodes, and the others of the driving electrodes are not designated as base electrodes; a detecting circuit, by signals of at least one detecting electrode, generating an evaluated signal for the driving electrodes, to which the driving signal is provided, based on one of a plurality of parameter sets when the driving signal is provided each time; and a control circuit selects one of the parameter sets as an initial parameter set of the base electrode so as to designate the evaluated signal, which is produced by detecting circuit based on the initial parameter set, as a level signal, and the initial parameter set of each one or each set of the non-base electrode is selected from the mentioned parameter set, wherein the evaluated signal of each one or each set of the non-base electrode based on the initial parameter set is the closet one to the level signal comparing to other evaluated signals produced by other parameter sets.

An objective of the present invention and the solutions for the prior-art problems are further achieved by the following technical schemes. A detecting method for touch screen, comprising: providing a touch screen, wherein the touch screen includes a plurality of parallel driving electrodes and a plurality of parallel detecting electrodes, and the driving electrodes and the detecting electrodes cross each other at intersections; selecting one driving electrode or one set of electrodes as the base electrode, and other electrodes or other sets of electrodes are as non-base electrode; providing a driving signal to the base electrode, and measuring the signals of at least one detecting electrode based on the one of the parameter sets; measuring signals of at least one detecting electrode in order based on one of other parameter sets until a signal of at least one detecting electrode is within the preset signal range when the signal of at least one detecting electrode are without a preset signal range; designating the signal of at least one detecting electrode which is within the preset signal range as a level signal, and the parameter set on which the base electrode is based is as an initial parameter set when the driving signal is provided to the base electrode; providing the driving signal to each one of each set of non-base electrodes in order; measuring signals of at least one detecting electrode in order based on one of the parameter sets when the driving signal is provided to each one or each set of non-base electrodes; and determining the initial parameter set of each one or each set of non-base electrodes, wherein the driving signal is provided separately to each one or each set of non-base electrodes, and the signal of at least one detecting electrode detected based on the initial parameter set is the closest level signal than the signals of at least one detecting electrode detected based on other parameter sets.

With the above technical schemes, the present invention at least has the following advantages and beneficial effects: providing the corresponding detecting parameters to differ-

DETAILED DESCRIPTION OF THE PREFERRED EMBODIMENTS

Figure 1:
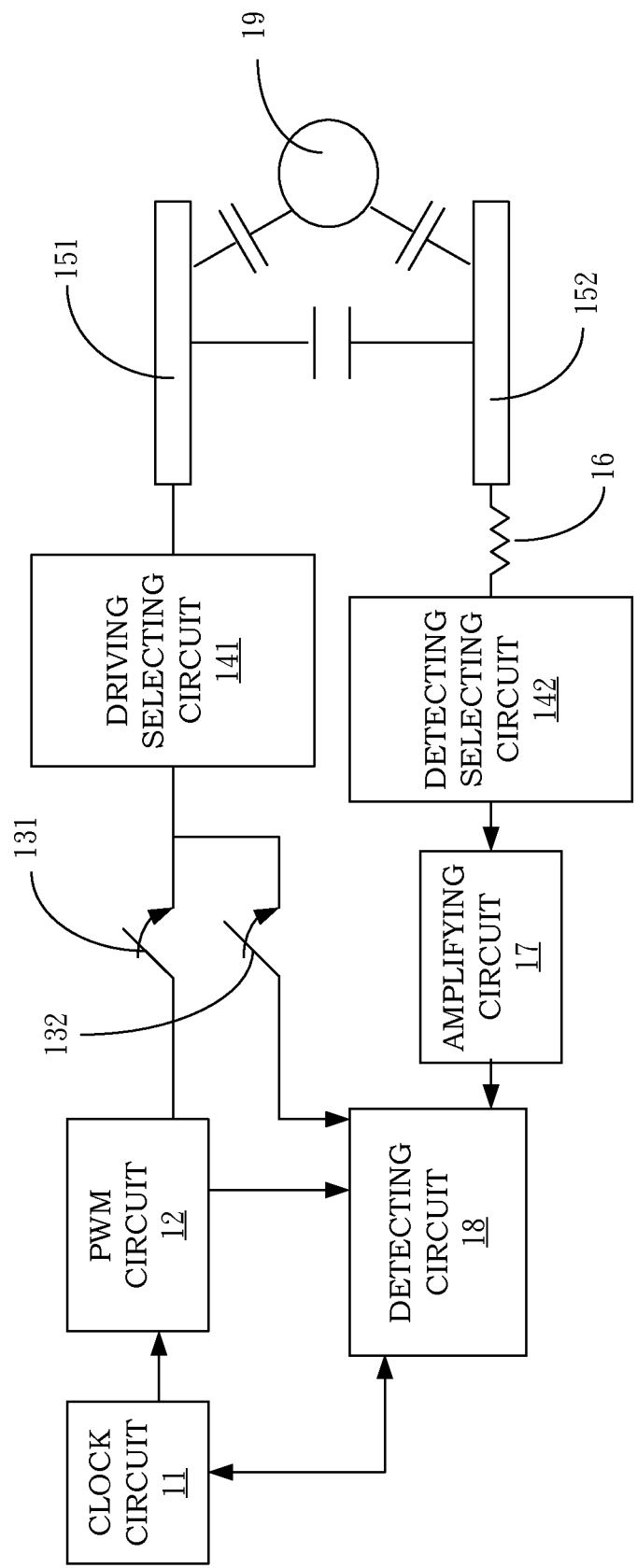
FIG. 1 and FIG. 4 are schematic diagrams illustrating capacitive touch screens and control circuits thereof according to the present invention.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Capacitive touch screens are vulnerable to noise, especially, that coming from the human body touching the screen. The present invention achieves the objective of reducing noise interference with an adaptive driving scheme.

In a capacitive touch screen, a plurality of electrodes arranged in rows and columns are used for detecting locations of the touches, in which power consumption is proportional to the number of simultaneously driven electrodes and the driving voltage. During touch detecting, noise may travel to the capacitive touch screen via the conductor touching the screen, degrading the signal to noise ratio (S/N ratio) and causing misjudgment of a touch or the location of a touch. In other words, the S/N ratio dynamically changes according to the object touching the screen as well as the surrounding environment.

Referring to FIG. 1, a schematic diagram illustrating a capacitive touch screen and a control circuit thereof according to the present invention is shown. It includes a clock circuit 11, a pulse width modulation (PWM) circuit 12, a driving switch 131, a detecting switch 132, a driving selecting circuit 141, a detecting selecting circuit 142, at least one driving electrode 151, at least one detecting electrode 152, a variable resistor 16, an amplifying circuit 17 and a measuring circuit 18. The capacitive touch screen may include the plurality of driving electrodes 151 and the plurality of detecting electrodes 152 crossing each other to form a plurality of intersections.

The clock circuit 11 provides a clock signal for the entire system based on a working frequency, and the PWM circuit 12 provides a PWM signal based on the clock signal and a PWM parameter to drive the driving electrodes 151. The driving switch 131 control the driving of the driving electrodes, and the selecting circuit 141 selects at least one driving electrode 151. In addition, the detecting switch 132 controls the electrical coupling between the driving electrodes and the measuring circuit 18. When the driving switch 131 is turned on, the detecting switch 132 is turned off, the PWM signal is provided via the driving selecting circuit 141 to driving electrode(s) 151 coupled by the driving selecting circuit 141, wherein there can be a plurality of driving electrodes 151, and the selected driving electrode(s) 151 can be one, two, or more. When a driving electrode 151 is driven by the PWM signal, capacitive coupling 152 will be generated at intersections of detecting electrodes 152 and the driving electrode 151 being driven, and each detecting electrode 152 will generate an input signal when capacitively coupled to the driving electrode 151. The variable resistor 16 provides impedance based on a resistor parameter, and the input signal is provided to the detecting selecting circuit 142 via the variable resistor 16. The detecting selecting circuit 142 selects one, two, three, multiple or all of the detecting electrodes 152 to couple with the amplifying circuit 17. The input signal is amplified by the amplifying circuit 17 based on a gain parameter and then provided to the measuring circuit 18. The measuring circuit 18 detects the input signal based on the PWM signal and the clock signal, wherein the measuring circuit 18 samples the detected signal with at least one phase based on a phase parameter. The measuring circuit 18 can, for example, include at least one integration circuit. Each integration circuit performs integration on an input signal in the input signal with at least one phase based on the phase parameter to measure the magnitude of the input signal. In an example of the present invention, each integration circuit performs integration on a pair of input signals in the input signal with at least one phase based on the phase parameter, or performs integration on the difference between signal differences of two pairs of input signals in the input signal with at least one phase based on the phase parameter. Moreover, the measuring circuit 18 may further include at least one analog-to-digital converter (ADC) to convert the detection result into a digital signal. In addition, it can be appreciated by one with ordinary skill in the art that the input signal can be first amplified by the amplifying circuit 17 before providing to the measuring circuit 18 by the detecting selecting circuit 142; the present invention is not limited as such.

In the present invention, capacitive touch screens have at least two types of driving modes: a power saving single-electrode driving mode, and a two-electrode driving mode, and have at least one driving potential. Each driving mode corresponding to a different driving potential has at least one working frequency. Each working frequency corresponds to a set of parameters. Each driving mode corresponding to a different driving potential represents power consumption of a different level.

Figure 2A:
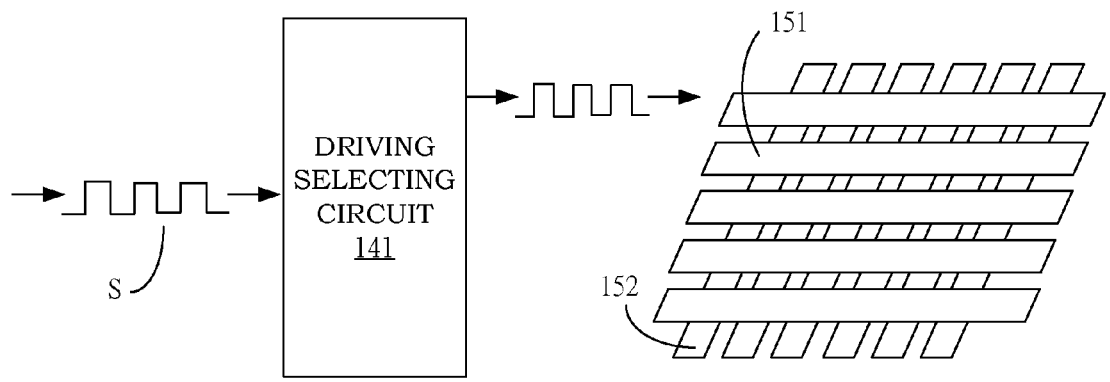
FIG. 2A is a schematic diagram illustrating a single-electrode driving mode.

The electrodes of a capacitive touch screen are divided into a plurality of driving electrodes and a plurality of detecting electrodes. The driving electrodes and the detecting electrodes cross each other at numerous intersections. Referring to FIG. 2A, in the single-electrode driving mode, driving electrodes are driven one at a time, that is, in any one instance, only a single driving electrode is provided with a driving signal S. When any driving electrode is driven, signals of all of the detecting electrodes are detected to generate one-dimensional (1D) sensing information. Accordingly, after all the driving electrodes are driven, 1D sensing information corresponding to every driving electrode is obtained, which together constitute a full image corresponding to all intersections.

Figure 2B:
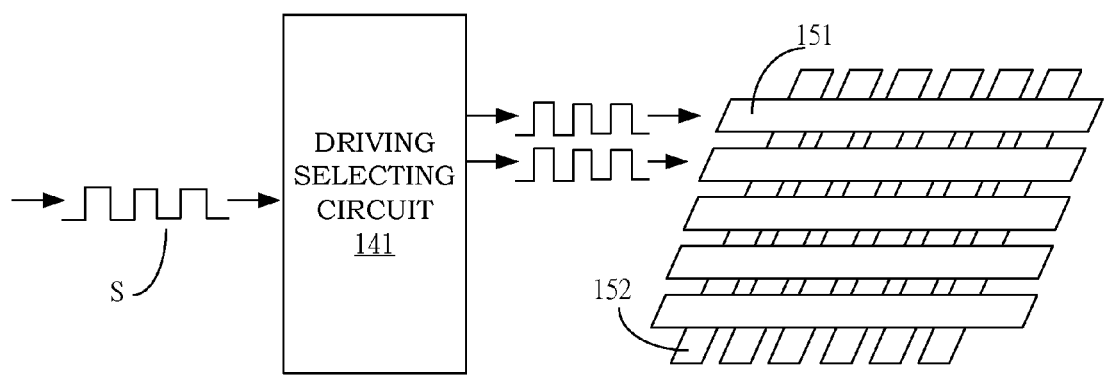
FIGS. 2B and 2C are schematic diagrams illustrating a two-electrode driving mode.
Figure 2C:
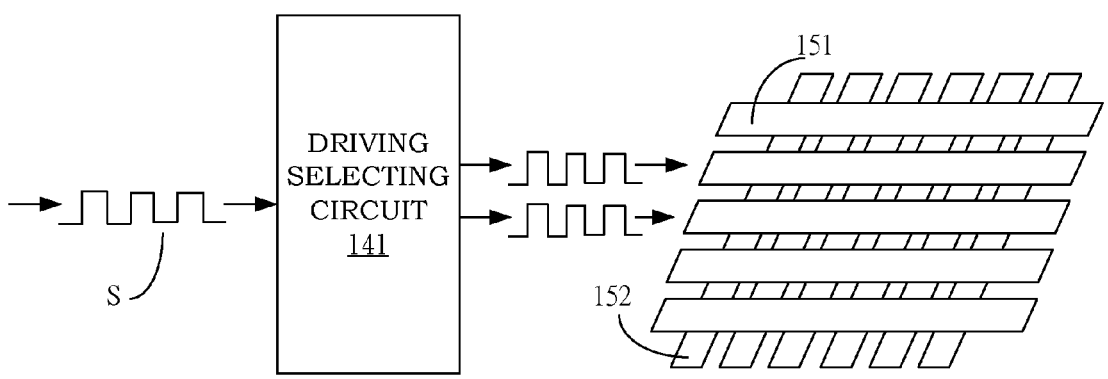

Referring to FIGS. 2B and 2C, in the two-electrode driving mode, a pair of adjacent driving electrodes is driven at a time. In other words, n driving electrodes require n-1 times of driving. When any pair of driving electrodes is driven, signals of all of the detecting electrodes are detected to generate 1D sensing information. For example, first, as shown in FIG. 2B, a driving signal S is simultaneously provided to a first pair of driving electrodes. Then, as shown in FIG. 2C, the driving signal S is simultaneously provided to a second pair of driving electrodes, and so on. Accordingly, after every pair (total of n-1 pairs) of driving electrodes are driven, 1D sensing information corresponding to every pair of driving electrodes is obtained, which together constitute a reduced image in comparison to the full image. The number of pixels of the reduced image is less than that of the pixels of the full image. In another example of the present invention, the two-electrode driving mode further includes perform single-electrode driving on electrodes at either end. When the electrodes at either end are driven, signals of all the detecting electrodes are detected to generate 1D sensing information, together they provide two 1D sensing information, which form an expanded image with the reduced image. For example, 1D sensing information corresponding to either side is placed outside the two sides of the reduced image to form the expanded image.

It can be appreciated by one with ordinary skill in the art that the present invention may also include three-electrode driving mode, four-electrode driving mode and the like, and they will not be further illustrated to avoid redundancy.

The driving potential may include, but is not limited to, at least two driving potentials, such as a low driving potential and a high driving potential. A higher driving potential has a higher S/N ratio.

According to the above, in the single-electrode driving mode, a full image can be obtained, whereas in the two-electrode driving mode, a reduced image and an expanded image can be obtained. The full image, the reduced image and the expanded image can be obtained before or when an external conductive object 19 approaches or touches the capacitive touch screen. The external conductive object 19 can be one or more. As mentioned before, when the external conductive object 19 approaches or touches the capacitive touch screen, or capacitive couples with the driving electrode(s) 151 and the detecting electrode(s) 152, noise interference may arise, even when the driving electrode 151 is not driven, the external conductive object 19 may still capacitive couple with the driving electrode(s) 151 and the detecting electrode(s) 152. Moreover, noise may interfere through some other routes.

Accordingly, the present invention provides a noise detecting process for detecting noise interference. During the noise detecting process, the driving switch 131 is turned off, and the detecting switch 132 is turned on, such that the measuring circuit can generate 1D sensing information of noise detection based on the signals of the detecting electrodes 152, thereby determining if the noise interference is within a tolerable range. For example, whether the noise interference is within the tolerable range can be determined by determining whether the 1D sensing information of noise detection exceeds a threshold, or whether the sum or the average of all the values of the 1D sensing information of noise detection exceeds a threshold. It can be appreciated by one with ordinary skill in the art that there are other ways of determining whether the noise interference is within the tolerable range based on the 1D sensing information of noise detection, which the present invention will not further illustrate.

The noise detecting process can be performed when the system is activated, or every time the full, the reduced, or the expanded image is obtained, or regularly or multiple times when the full, the reduced, or the expanded image is obtained, or when an approaching or touch by an external conductive object is detected. It can be appreciated by one with ordinary skill in the art that there are other suitable timings for performing the noise detecting process; the present invention is not limit to these.

The present invention further proposes a frequency switching process for switching frequencies when the noise interference exceeds the tolerable range. The measuring circuit is provided with several sets of frequency settings, which can be stored in a memory or other storage media and can be selected by the measuring circuit during the frequency switching process. The clock signal of the clock circuit 11 is thus controlled by the selected frequency. The frequency switching process may include selects a suitable frequency setting from the frequency settings, for example, sequentially uses a set of frequency setting and performs the noise detecting process until the noise interference is within the tolerable range. The frequency switching process may alternatively include selects the best frequency setting from the frequency settings, for example, sequentially uses a set of frequency setting and performs the noise detecting process, and selects the frequency setting with the least noise interference, for example, the frequency setting with the smallest maximum value of the 1D sensing information of noise detection, or the frequency setting with the smallest sum or average of all the values of the 1D sensing information of noise detection.

The frequency settings include, but are not limited to, a driving mode, a frequency and a set of parameters. The set of parameters may include, but is not limited to, said resistor parameter, said gain parameter, said phase parameter and said PWM parameter. It can be appreciated by one with ordinary skill in the art that there are other parameters suitable for the capacitive touch screen and its control circuit.

The frequency settings may include a plurality of driving potentials, such as a first driving potential and a second driving potential, as shown in Table 1 below. It can be appreciated by one with ordinary skill in the art that there can be three or more driving potentials. Each driving potential can be divided into several driving modes, including, but not limited to, single-electrode driving mode, two-electrode driving mode, three-electrode driving mode, four-electrode driving mode etc. Each driving mode of each driving potential includes a plurality of frequencies, each frequency corresponds to a set of parameters just mentioned. It can be appreciated by one with ordinary skill in the art that the frequencies of each driving mode corresponding to each driving potential may be entirely different, or partially the same; the present invention is not limited as such. Table 1

| Driving Potential | Driving Mode | Frequency | Parameter Set |
|---|---|---|---|
| First driving potential | Single-electrode driving mode | First frequency | First parameter set |
| | | First frequency | First parameter set |
| | | ... | ... |
| | | $i^{th}$ frequency | $i^{th}$ parameter set |
| | Two-electrode driving mode | $i+1^{th}$ frequency | $i+1^{th}$ parameter set |
| | | $i+2^{th}$ frequency | $i+2^{th}$ parameter set |
| | | ... | ... |
| | | $j^{th}$ frequency | $j^{th}$ parameter set |
| Second driving potential | Single-electrode driving mode | $j+1^{th}$ frequency | $j+1^{th}$ parameter set |
| | | $j+2^{th}$ frequency | $j+2^{th}$ parameter set |
| | | ... | ... |
| | | $k^{th}$ frequency | $k^{th}$ parameter set |
| | Two-electrode driving mode | $k+1^{th}$ frequency | $k+1^{th}$ parameter set |
| | | $k+2^{th}$ frequency | $k+2^{th}$ parameter set |
| | | ... | ... |
| | | $n^{th}$ frequency | $n^{th}$ parameter set |

Figure 3A:
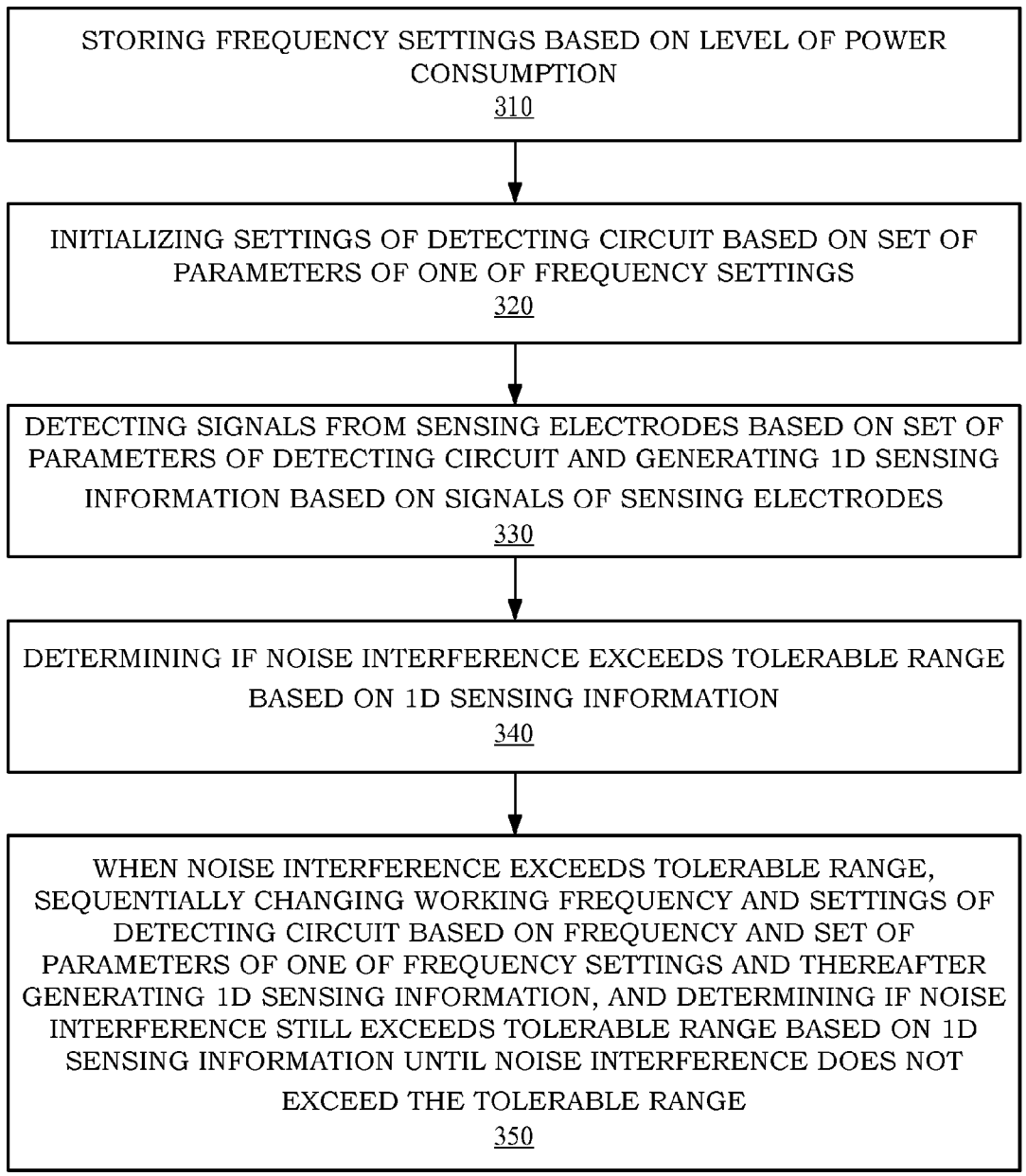
FIGS. 3A and 3B is a flowchart illustrating a detection method for the capacitive touch screen according to the present invention.

According to the above, the present invention proposes a detecting method for the capacitive touch screen. Referring to FIG. 3A, first, in step 310, a plurality of frequency settings are stored based on the levels of power consumption. Each frequency setting corresponds to a driving mode of a driving potential, and each frequency setting has a frequency and a set of parameters, wherein there are at least one type of driving potential. Next, in step 320, the setting of the detecting circuit is initialized based on the set of parameter of one of the frequency settings, and in step 330, signals of the detecting electrodes are detected by the detecting circuit based on a set of parameters of the detecting circuit, and 1D sensing information is generated from the signals of the detecting electrodes. Then, in step 340, it is determined whether noise interference exceeds a tolerable range based on the 1D sensing information. Thereafter, in step 350, when the noise interference exceeds the tolerable range, the working frequency and the setting of the detecting circuit are changed according to the frequency and the set of parameter of one of the frequency settings, and 1D sensing information is generated, and then it is again determined whether the noise interference exceeds the tolerable range based on the 1D sensing information. This step is repeated until the noise interference is within the tolerable range. Alternatively, in step 360 of FIG. 3B, when the noise interference exceeds the tolerable range, the working frequency and the setting of the detecting circuit are changed according to the frequency and the set of parameter of every of the frequency settings, and 1D sensing information is generated and then the noise interference is determined based on the 1D sensing information, and the working frequency and the setting of the detecting circuit are changed to the frequency and the set of parameter of the frequency setting that is least interfered by noise.

For example, a detecting device for detecting a capacitive touch sensor is proposed according to a best mode of the present invention, which includes a storage circuit 43, a driving circuit 41 and a detecting circuit 42. As described in step 310, the storage circuit 43 includes a plurality of frequency settings 44 stored according to the levels of power consumption. The storage circuit 43 can be a circuit, a memory or a storage media capable of storing electromagnetic records. In an example of the present invention, the frequency settings 44 can be implemented as a lookup table. In addition, the frequency settings 44 can also store a power consumption parameter.

The driving circuit 41 can be an integration of several circuits, including, but not limited to, the clock circuit 11, the PWM circuit 12, the driving switch 131, the detecting switch 132 and the driving selecting circuit 141. The circuits listed in this example is merely for illustration purpose, and the driving circuit 41 may only include some of the circuits or add more circuits; the present invention is not limited as such. The driving circuit is used to provide a driving signal to at least one driving electrode 151 of a capacitive touch screen according to a working frequency, wherein the capacitive touch screen includes a plurality of driving electrodes 151 and a plurality of detecting electrodes 152.

Figure 3B:
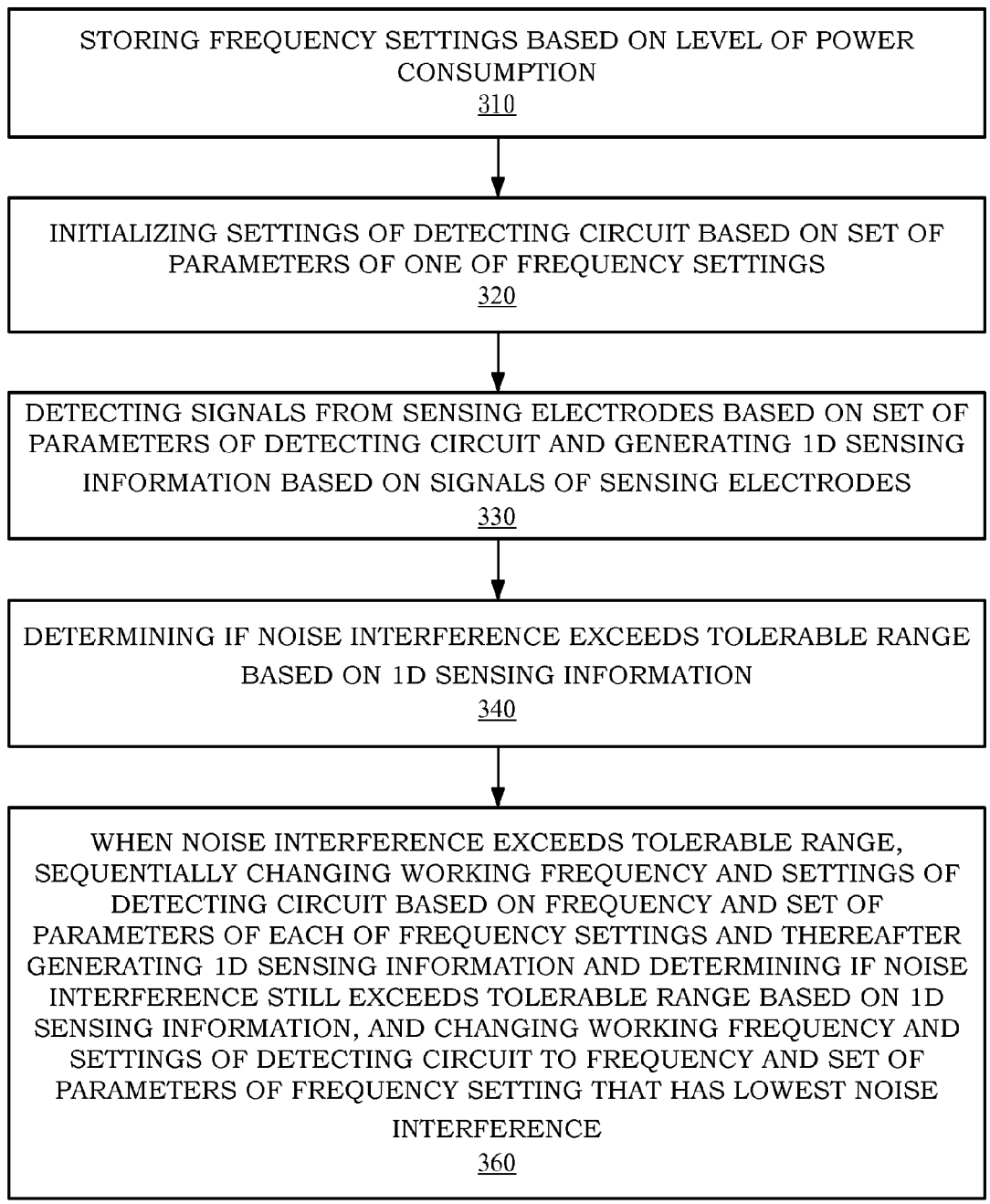

The detecting circuit 42 can be an integration of several circuits, including, but not limited to, the measuring circuit 18, the amplifying circuit 17, the detecting selecting circuit 142, and even the variable resistor 16. The circuits listed in this example is merely for illustration purpose, and the detecting circuit 42 may only include some of the circuits or add more circuits; the present invention is not limited as such. Furthermore, the detecting circuit 42 may further include performing the steps 320 to 340, and step 350 or step 360. In the example of FIG. 3B, the frequency settings are not necessarily stored according to the levels of power consumption.

As previously described, the 1D sensing information for determining whether the noise interference exceeds the tolerable range is generated when no driving signal is provided to the driving electrode(s), for example, when the driving switch 131 is turned off and the detecting switch 132 is turned on.

In an example of the present invention, the at least one driving potential has several types of driving modes, including a single-electrode driving mode and a two-electrode driving mode. In the single-electrode driving mode, the driving signal is provided to only a single driving electrode at any instance, while in the two-electrode driving mode, the driving signal is provided to a pair of driving electrodes simultaneously. The level of power consumption of the single-electrode driving mode is less than the level of power consumption in the two-electrode driving mode. In addition, in the single-electrode driving mode, when every driving electrode is driven by the driving signal, 1D sensing information is generated by the detecting circuit to constitute a full image. In the two-electrode driving mode, when every pair of driving electrodes is driven by the driving signal, 1D sensing information is generated by the detecting circuit to constitute a reduced image. The number of pixels of the reduced image is less than that of the pixels of the full image. Moreover, in the two-electrode driving mode, the detecting circuit may further perform single-electrode driving on electrodes at either end. When the electrodes at either end are driven, signals of all the detecting electrodes are detected to generate 1D sensing information, wherein the 1D sensing information for the electrodes at either side are placed outside the two sides of the reduced image to form the expanded image, and the number of pixels of the expanded image is greater than that of the pixels of the full image.

In another example of the present invention, the driving potential includes a first driving potential and a second driving potential, wherein the level of power consumption for generating the full image in the single-electrode driving mode of the first driving potential>the level of power consumption for generating the reduced image in the two-electrode driving mode of the first driving potential>the level of power consumption for generating the full image in the single-electrode driving mode of the second driving potential.

In yet another example of the present invention, the driving potential includes a first driving potential and a second driving potential, wherein the level of power consumption for generating the full image in the single-electrode driving mode of the first driving potential>the level of power consumption for generating the full image in the single-electrode driving mode of the second driving potential.

Moreover, in an example of the present invention, the signal of each detecting electrode is passed through a variable resistor before providing to the detecting circuit. The detecting circuit sets the impedance of the variable resistor according to the set of parameter of one of the frequency settings. In addition, the signals of the detecting electrodes are first amplified by at least one amplifier before being detected. The detecting circuit sets the gain of the amplifier according to the set of parameter of one of the frequency settings. In addition, the driving signal is generated according to the set of parameter of one of the frequency settings.

In an example of the present invention, each value of 1D sensing information is generated according to the signals of the detecting electrodes in a defined period, wherein the defined period is determined according to the set of parameter of one of the frequency settings. In an example of the present invention, each value of 1D sensing information is generated according to the signals of the detecting electrodes with at least one defined phase, wherein the defined phase is determined according to the set of parameter of one of the frequency settings.

In addition, the driving circuit 41, the detecting circuit 42 and the storing circuit could be controlled by a control circuit 45. The control circuit 45 could be a programmable controller or any other type of control circuit, the present invention is not limited as such.

Figure 5:
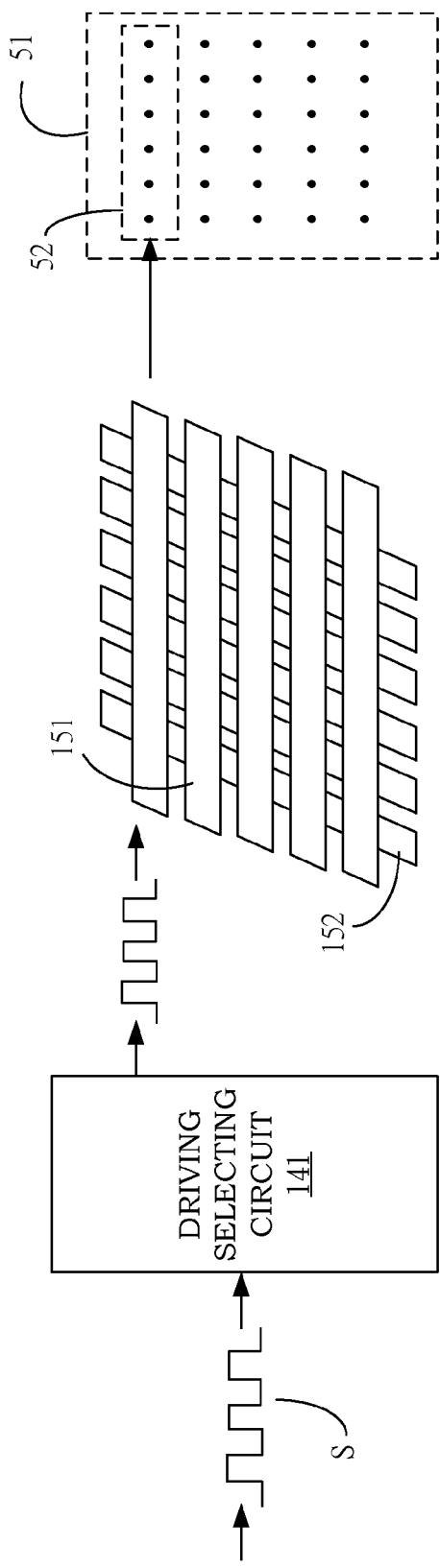
FIG. 5 is a schematic diagram illustrating the generation of a full image.

Referring to FIG. 5, a schematic diagram illustrating the single-electrode driving mode proposed by the present invention is shown. A driving signal S is sequentially provided to a first driving electrode, a second driving electrode . . . and the last driving electrode. 1D sensing information for single-electrode driving 52 is generated when each driving electrode is driven by the driving signal S. All the 1D sensing information for single-electrode driving 52 are combined together to constitute a full image 51. Each value of the full image 51 corresponds to changes in capacitive coupling of one of the electrode intersections.

Furthermore, each value of the full image 51 corresponds to a location of one of the intersections. For example, the center location of each driving electrode corresponds to a first 1D coordinate, while the center location of each detecting electrode corresponds to a second 1D coordinate. The first 1D coordinate can be one of a lateral (e.g. horizontal or X-axis) coordinate and longitudinal (e.g. vertical or Y-axis) coordinate, while the second 1D coordinate can be the other one of a lateral (e.g. horizontal or X-axis) coordinate and longitudinal (e.g. vertical or Y-axis) coordinate. Each intersection corresponds to a 2D coordinate of a driving electrode and a detecting electrode intersecting thereat. The 2D coordinate is made up of the first 1D coordinate and the second 1D coordinate, for example, (first 1D coordinate, second 1D coordinate) or (second 1D coordinate, first 1D coordinate). In other words, the 1D sensing information generated by each single-electrode driving corresponds to the first 1D coordinate at the center of a driving electrode, wherein each value of the 1D sensing information for single-electrode driving (or each value of the full image) corresponds to a 2D coordinate made up of the first 1D coordinate at the center of the driving electrode and the second 1D coordinate at the center of a detecting electrode. Similarly, each value of the full image corresponds to the center location of one of the intersections, that is, corresponds to a 2D coordinate made up of the first 1D coordinate at the center of a driving electrode and the second 1D coordinate at the center of a detecting electrode.

Figure 6:
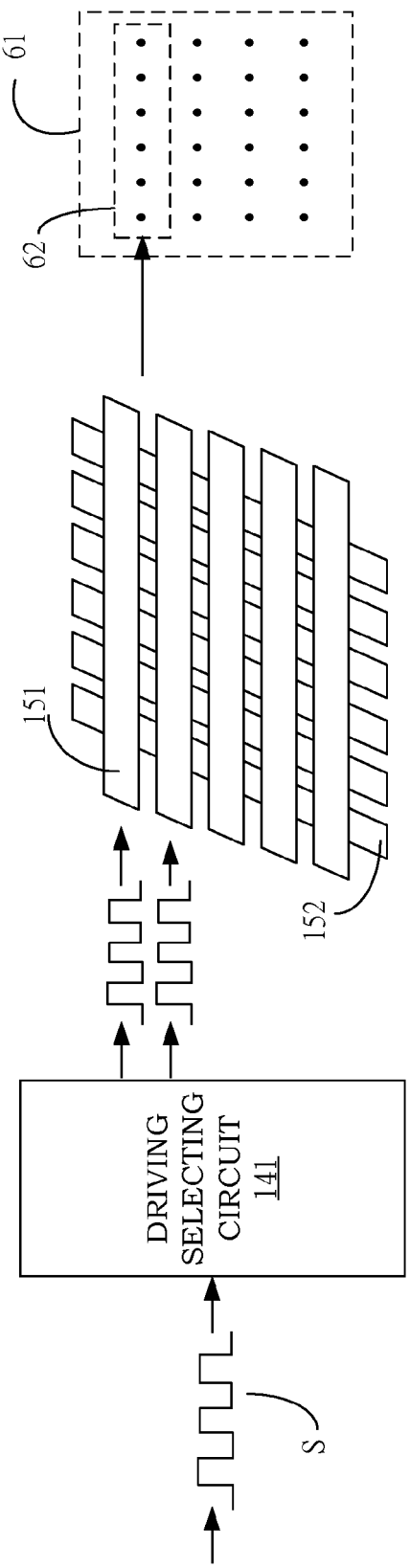
FIG. 6 is a schematic diagram illustrating the generation of a reduced image.

Referring to FIG. 6, a schematic diagram illustrating the two-electrode driving mode proposed by the present invention is shown. A driving signal S is sequentially provided to a first pair of driving electrodes, a second pair of driving electrodes . . . and the last pair of driving electrodes. 1D sensing information for two-electrode driving 62 is generated when each pair of driving electrodes is driven by the driving signal S. In other words, N driving electrodes make up N-1 (multiple) pairs of driving electrodes. All the 1D sensing information for two-electrode driving 62 are combined together to constitute a reduced image 61. The number of values (or pixels) of the reduced image 61 is less than the number of values (or pixels) of the full image 51. In contrast to the full image, each 1D sensing information for two-electrode driving 62 of the reduced image corresponds to a first 1D coordinate of a center location between a pair of driving electrodes, and each value corresponds to a 2D coordinate made up of the first 1D coordinate of the center location between the pair of driving electrodes and a second 1D coordinate at the center of a detecting electrode. In other words, each value of the reduced image corresponds to the location of the center between a pair of intersections, that is, corresponds to a 2D coordinate made up of the first 1D coordinate of the center location between a pair of driving electrodes (or one of several pairs of driving electrodes) and a second 1D coordinate at the center of a detecting electrode.

Figure 7A:
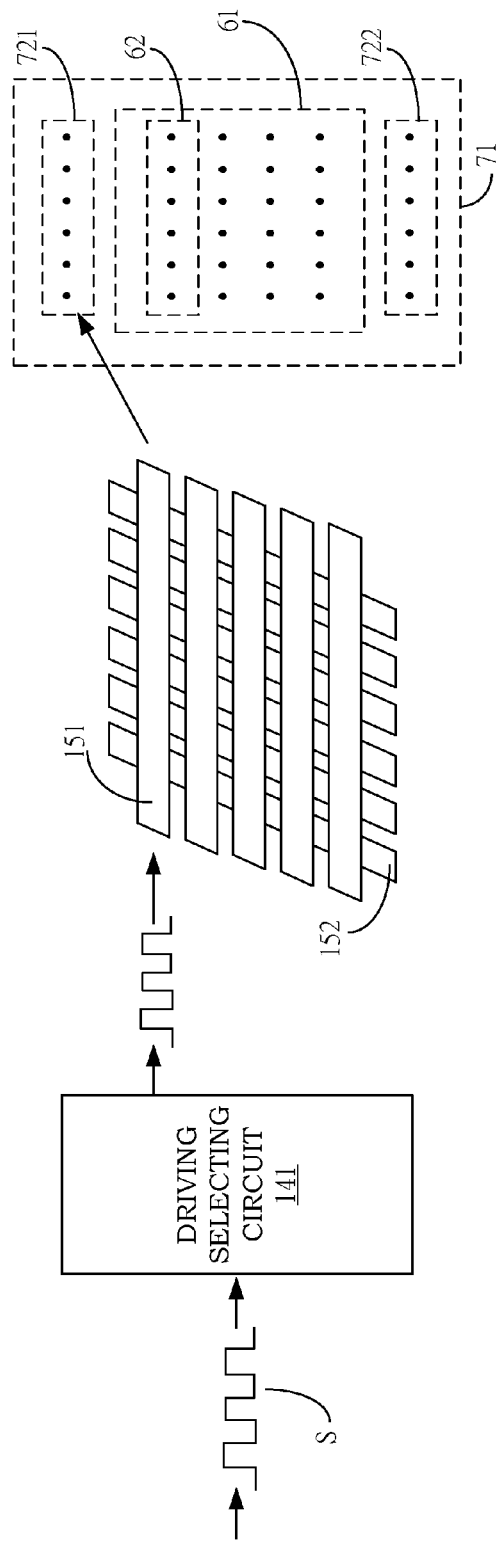
FIGS. 7A and 7B are schematic diagrams illustrating the generation of an expanded image.
Figure 7B:
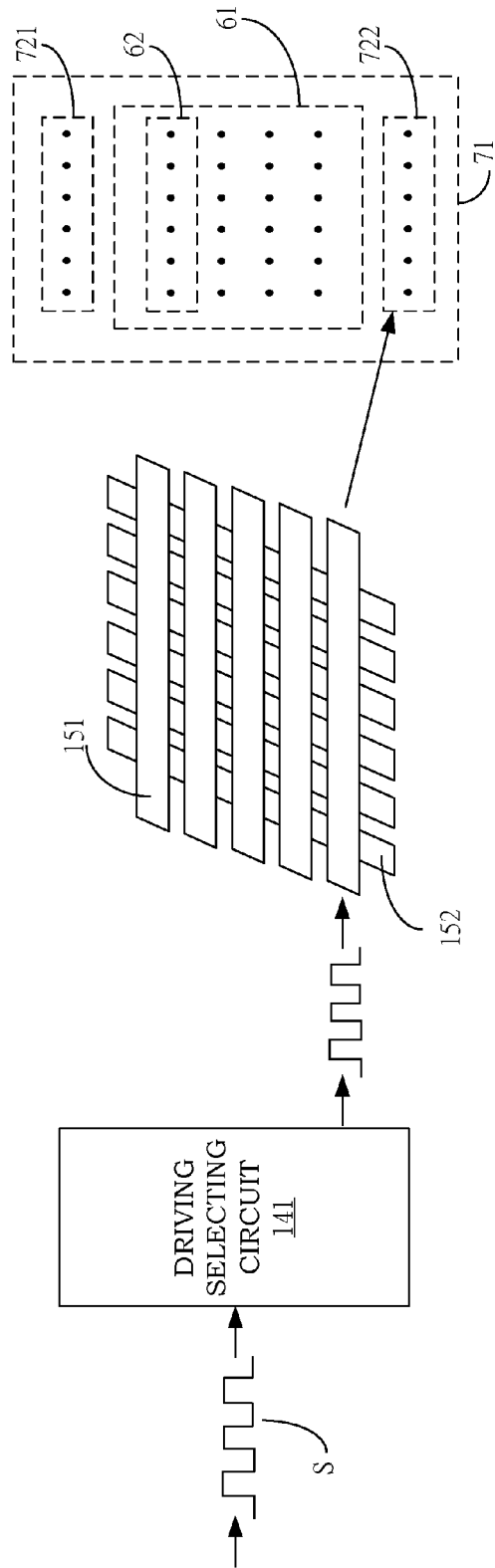

Referring to FIG. 7A, a schematic diagram illustrating a first side single-electrode driving in the two-electrode driving mode proposed by the present invention is shown. A driving signal S is provided to a driving electrode nearest to a first side of a capacitive touch screen, and first-side 1D sensing information for single-electrode driving 721 is generated when the driving electrode nearest to the first side of the capacitive touch screen is being driven by the driving signal S. Now referring to FIG. 7B, a schematic diagram illustrating a second side single-electrode driving in the two-electrode driving mode proposed by the present invention is shown. A driving signal S is provided to a driving electrode nearest to a second side of a capacitive touch screen, and second-side 1D sensing information for single-electrode driving 722 is generated when the driving electrode nearest to the second side of the capacitive touch screen is being driven by the driving signal S. The 1D sensing information for single-electrode driving 721 and 722 generated when the driving electrodes nearest to the first and second sides of the capacitive touch screen are being driven are placed outside the first and second sides of the reduced image 61 mentioned before, respectively, to form an expanded image 71. The number of values (or pixels) in the expanded image 71 is greater than the number of values (or pixels) in the full image 51. In an example of the present invention, the first-side 1D sensing information for single-electrode driving 721 is generated first, then the reduced image 61 is generated, and then the second-side 1D sensing information for single-electrode driving 722 is generated to construct the expanded image 71. In another example of the present invention, the reduced image 61 is generated first, and thereafter, the first- and second-side 1D sensing information for single-electrode driving 721 and 722 are generated to construct the expanded image 71.

In other words, the expanded image is made up of the first-side 1D sensing information for single-electrode driving, the reduced image and the second-side 1D sensing information for single-electrode driving. Since the values in the reduced image 61 are two-electrode driven, so the average magnitude will be greater than that of the first- and second-side 1D sensing information for single-electrode driving. In an example of the present invention, the values of the first- and second-side 1D sensing information for single-electrode driving 721 and 722 are first amplified by a ratio before placing outside the first and second sides of the reduced image 61. This ratio can be a predetermined multiple greater than 1, or based on the ratio between the values of the 1D sensing information for two-electrode driving and the values of the 1D sensing information for single-electrode driving, for example, the ratio between the sum (or average) of all the values of the first-side 1D sensing information for single-electrode driving 721 and the sum (or average) of all the values of the 1D sensing information 62 near the first side in the reduced image, and the values of the first-side 1D sensing information for single-electrode driving 721 are amplified by this ratio before placing outside the first side of the reduced image 61. Similarly, the values of the second-side 1D sensing information for single-electrode driving 722 are amplified by this ratio before placing outside the second side of the reduced image 61. Alternatively, for example, said ratio is the ratio between the sum (or average) of all the values in the reduced image 61 and the sum (or average) of all the values of the first- and second-side 1D sensing information for single-electrode driving 721 and 722.

In the single-electrode driving mode, each value (or pixel) of the full image corresponds to a 2D location (or coordinate) of an intersection made up of the first 1D location (or coordinate) corresponding to the driving electrode and the second 1D location (or coordinate) corresponding to the detecting electrode intersecting at the intersection, for example (first 1D location, second 1D location) or (second 1D location, first 1D location). A single external conductive object may be capacitively coupled to one or more intersections. The intersection(s) capacitively coupled to the external conductive object generate(s) changes in capacitive coupling, which are reflected in the corresponding value(s) in the full image, that is, in the corresponding value(s) in the full image corresponding to the external conductive object. Thus, based on the corresponding values and 2D coordinates in the full image corresponding to the external conductive object, a centroid location (a 2D coordinate) of the external conductive object can be calculated.

In an example of the present invention, in the single-electrode driving mode, the 1D location corresponding to each electrode (driving and detecting electrodes) is the location of the center of the electrode. Based on another example of the present invention, in the two-electrode driving mode, the 1D location corresponding to each pair of electrodes (driving and detecting electrodes) is the location of the center between the two electrodes.

In the reduced image, a first 1D sensing information corresponds to the center location of a first pair of driving electrodes, that is, a first 1D location of the center between a first and a second driving electrodes (the first pair of driving electrodes). If the centroid location is simply calculated, a location can be calculated only in the range from the center of the first pair of driving electrodes to the center of the last pair of driving electrodes. The range in which the location is calculated based on the reduced image lacks a range from the center location of the first driving electrode to the center location (the first 1D location of the center) of the first pair of driving electrodes, and a range from the center location of the last pair of driving electrodes to the center location of the last driving electrode.

In contrast to the reduced image, in the expanded image, the first- and second-side 1D sensing information correspond to the center locations of the first and last driving electrodes, respectively. Thus, the range in which the location is calculated based on the expanded image, compared to that calculated based on the reduced image, further includes the range from the center location of the first driving electrode to the center location (the first 1D location of the center) of the first pair of driving electrodes, and the range from the center location of the last pair of driving electrodes to the center location of the last driving electrode. In other words, the range in which the location is calculated based on the expanded image covers the range in which the location is calculated based on the full image.

Similarly, the two-electrode driving mode can be further expanded to a multiple-electrode driving mode, that is, multiple driving electrodes are simultaneously driven. In other words, the driving signal is simultaneously provided to multiple (or all) driving electrodes in a set of driving electrodes. The number of driving electrodes in a set of driving electrodes may, for example, be two, three or four. The multiple-electrode driving mode includes the two-electrode driving mode, but not the single-electrode driving mode.

Figure 8:
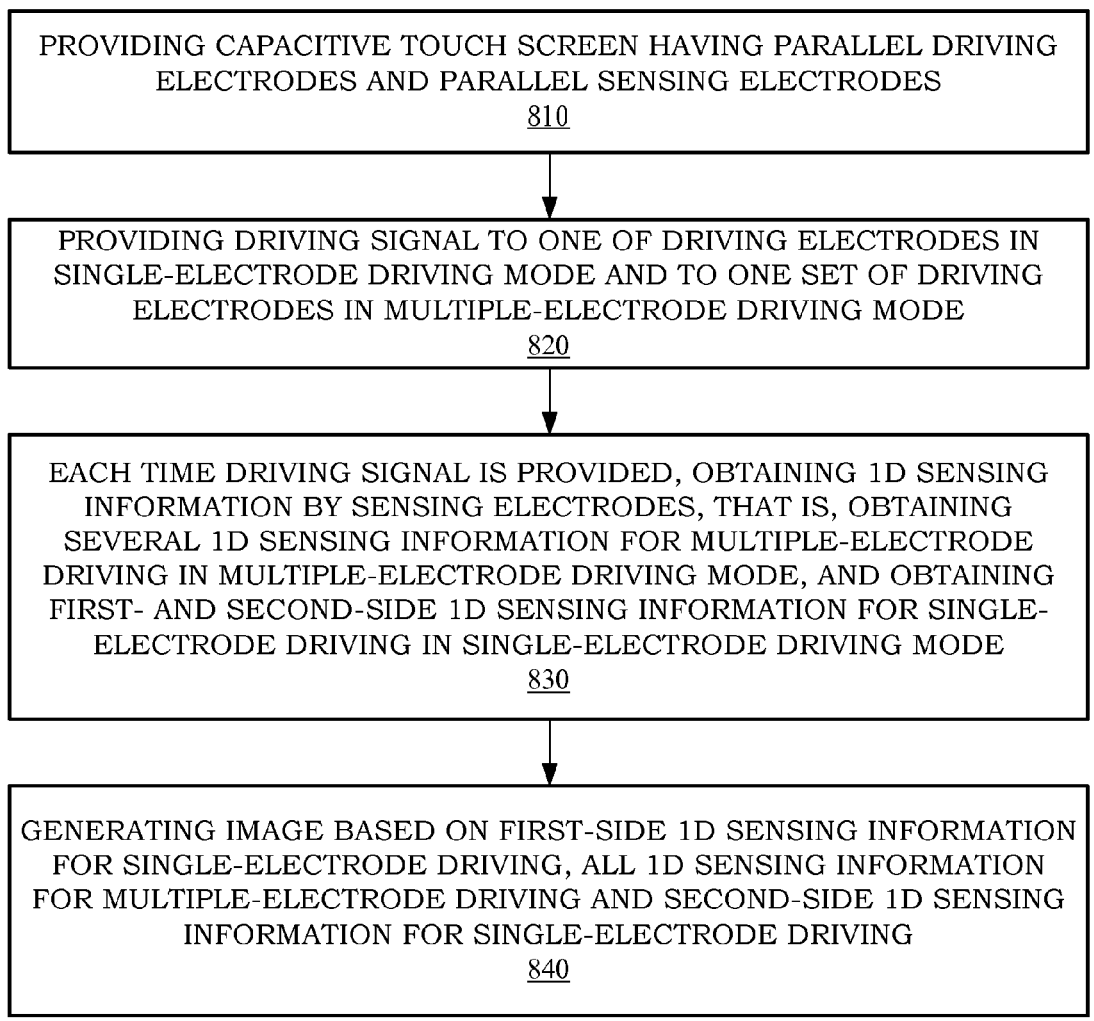
FIG. 8 is a flowchart illustrating the generation of the expanded image according to the present invention.

Referring to FIG. 8, a detecting method for a capacitive touch screen proposed by the present invention is shown. In step 810, a capacitive touch screen including a plurality of parallel driving electrodes and a plurality of parallel detecting electrodes is provided, wherein the driving electrodes and the detecting electrodes (e.g. the driving electrodes 151 and the detecting electrodes 152) cross each other at intersections. Next, in step 820, one and a set of driving electrodes among the plurality of driving electrodes is/ are provided with a driving signal in the single-electrode driving mode and the multiple-electrode driving mode, respectively, that is, one of the driving electrodes are driven by the driving signal at a time in the single-electrode driving mode, while a set of driving electrodes in the driving electrodes are simultaneously driven by the driving signal at a time in the multiple-electrode driving mode, wherein apart from the last N driving electrodes, each driving electrodes and two successive driving electrodes form the set of driving electrodes to be driven simultaneously, and N is the number of the set minus one. The driving signal can be provided by the driving circuit 41 described before. Thereafter, in step 830, each time the driving signal is provided, 1D sensing information is obtained via the detecting electrodes; more specifically, a plurality of 1D sensing information for multiple-electrode driving are obtained in the multiple-electrode driving mode and first- and second-side 1D sensing information for single-electrode driving are obtained in the single-electrode driving mode. For example, in the multiple-electrode driving mode, one 1D sensing information for multiple-electrode driving is obtained when each set of driving electrodes are provided with the driving signal. Alternatively, for example, in the single-electrode driving mode, one first-side 1D sensing information for single-electrode driving and one second-side 1D sensing information for single-electrode driving are obtained when the first driving electrode and the last driving electrode are provided with the driving signal, respectively. The 1D sensing information can be obtained by the detecting circuit 42 described above. The 1D sensing information thus includes the 1D sensing information for multiple-electrode driving (reduced image) and the first- and second-side 1D sensing information for single-electrode driving. Then, in step 840, an image (an expanded image) is generated according to the first-side 1D sensing information for single-electrode driving, all the 1D sensing information for multiple-electrode driving and the second-side 1D sensing information for single-electrode driving. Step 840 can be performed by the control circuit described before.

As described before, the potential of the driving signal in the single-electrode driving mode is not necessary the same as the potential of the driving signal in the multiple-electrode driving mode; they can be the same or different. For example, the single-electrode driving is performed with a first AC potential larger than a second AC potential for the multiple-electrode driving. The ratio of the first AC potential to the second AC potential can be a predetermined ratio. In addition, in step 840, the image is generated based on all the values of the first- and second-side 1D sensing information for single-electrode driving being multiplied by the same predetermined ratio or different predetermined ratios. Moreover, the frequency of the driving signal in the single-electrode driving mode can be different from that of the driving signal in the multiple-electrode driving mode.

The number of driving electrodes in the set of driving electrodes can be two, three or more; the present invention is not limited to these. In a preferred mode of the present invention, the number of driving electrodes in the set of driving electrodes is two. When the number of driving electrodes in the set of driving electrodes is two, each driving electrode corresponds to a first 1D coordinate, wherein 1D sensing information driven by each group (or pair) of the electrodes corresponds to a first 1D coordinate of the center between the pair of driving electrodes among the plurality of driving electrodes, and the first- and second-side 1D sensing information for single-electrode driving correspond to first 1D coordinates of the first and the last driving electrodes, respectively.

Similarly, when the number of driving electrodes in the set of driving electrodes is more than two, each driving electrode corresponds to a first 1D coordinate, wherein 1D sensing information driven by each set of multiple electrodes corresponds to a first 1D coordinate of the center between two driving electrode separated the furthest in the set of driving electrodes, and the first- and second-side 1D sensing information for single-electrode driving correspond to first 1D coordinates of the first and the last driving electrodes, respectively.

Moreover, each detecting electrode corresponds to a second 1D coordinate, and each value of each 1D sensing information corresponds to the second 1D coordinate of one of the detecting electrodes.

Figure 9A:
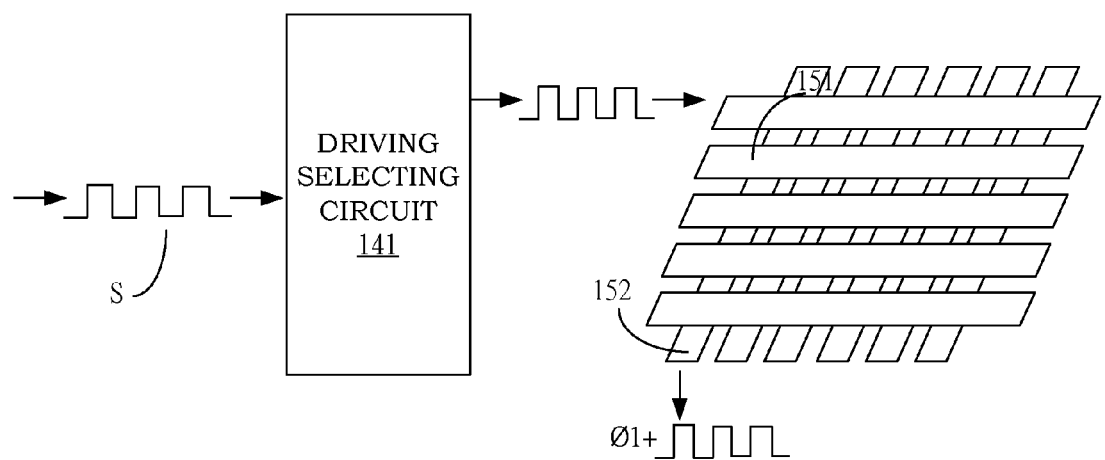
FIGS. 9A and 9B are schematic diagrams illustrating the different phase differences produced from driving signals by different driving electrodes.
Figure 9B:
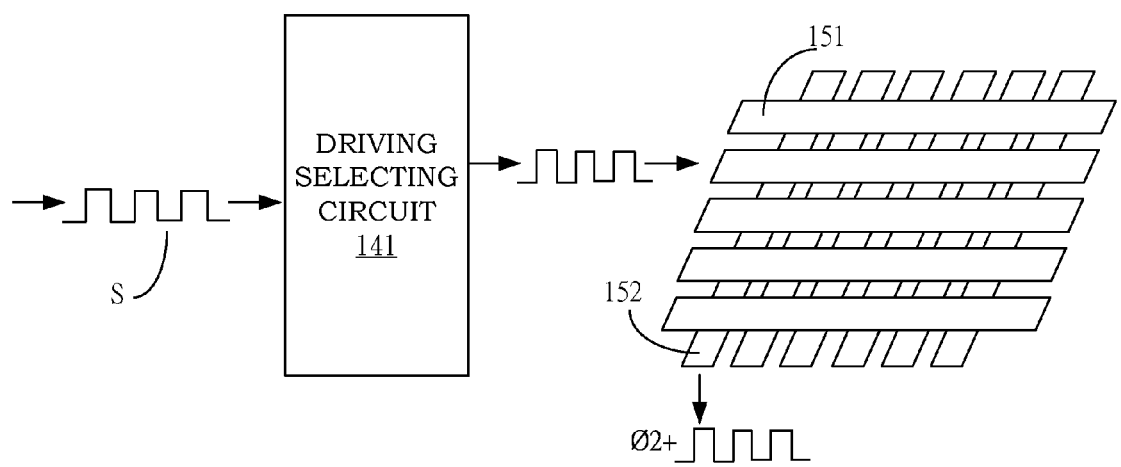

Referring to FIGS. 9A and 9B, a schematic diagram illustrating the detecting electrodes receiving capacitively coupled signals via driving electrodes. When signals pass through electrical loads such as capacitive coupling, the first phase difference φ1 is generated between the signal received by the first detecting electrode and the signal before being provided to the driving electrode, as shown in 9A. When the driving signal is provided to the second driving electrode, the second phase difference φ2 is generated between the signal received by the first detecting electrode and the signal before being provided to the driving electrode, as shown in 9B.

The first phase difference φ1 and the second phase difference φ2 are different due to different RC circuits through which the driving signals pass. When the periods of the driving signals are the same, different phase differences represent that signals with different time delays are received. If avoiding the foregoing phase difference to detect signals directly, the measurement results will be different due to the different initial phases of the signals. For example, the phase difference is 0 degree, and the signal is a sinusoidal wave with the amplitude A. When detecting the signals with the phase differences of 30 degrees, 90 degrees, 150 degrees, 210 degrees, 270 degrees and 330 degrees, the signals of |1/2 A|, |A|, |1/2 A|, |−1/2 A|, |−A| and |−1/2 A| will be received, respectively. But at the phase difference of 150 degrees, the phase differences are measured with deviation so as to receive the signals of 0, $$-\frac{\sqrt{2}}{2}A, -\frac{\sqrt{2}}{2}A, 0, \frac{\sqrt{2}}{2}A \text{ and } \frac{\sqrt{2}}{2}A$$

when detecting the signals with the phase differences of 30 degrees, 90 degrees, 150 degrees, 210 degrees, 270 degrees and 330 degrees.

In the above-mentioned embodiment, initial phase delay of the measurement due to the phase difference causes the different measurement result. Whether the driving signal is the sinusoidal wave or the PWM, the similar difference always exists.

In addition, when the driving signal is provided each time, it can be provided to a plurality of adjacent driving electrodes, wherein the driving electrodes are parallelized arranged in order. In the preferred embodiment of the invention, the driving signal is provided to two adjacent driving electrodes. At one scan, n electrodes are provided the driving signal n-1 times, wherein the driving signal is provided to one set of the electrodes. For example, the first and second electrodes are provided at first time, the second and third electrodes are provided at second time, and so on. As above-mentioned, when the driving signal is provided each time, the provided set of electrodes could be one, two or more electrodes. The amount of the electrodes being provided the driving signal is not limited in the invention. When the driving signal is provided each time, all signals measured by detecting electrodes could compose a 1-D sensing information. All 1-D sensing information at one scan could compose a 2-D sensing information which could be considered to an image.

Accordingly, in the best mode of a first embodiment of the invention, different phase differences are adopted at different electrodes so as to delay the detecting signal. For example, a plurality of phase differences are decided at first. When each set of driving electrodes are provided the driving signal, the signal is measured based on each phase. The phase difference on which the largest one of the measured signals stands closest approaches the phase difference between the signal before being provided to the driving electrodes and the signal after being received by the detecting electrodes, called the closest phase difference. The signal measurement could be to select one of the detecting electrodes to measure based on each phase difference, or select many or all detecting electrodes to measure based on each phase difference. The closest phase difference is determined based on the total amount of signals of the many or all detecting electrodes. Accordingly, the closest phase difference of each set of electrodes could be determined. In other words, after each set of electrodes are provided the driving signal, the closest phase difference of all the detecting delayed to be provided the driving signal starts to be measured.

In addition, the signals could be measured based on part of the phase differences rather than all of them. The signals could be measured based on one of the phase differences in order, and be stopped until measuring the gradually increasing signal followed by the gradually decreasing signal, wherein the largest one of the measured signals is measured based on the closest phase difference. In this way, the image with stronger signals could be obtained.

In addition, a set of the driving electrodes could be selected to be a base electrode firstly, and others of the electrodes are called the non-base electrodes. At first, the closest phase difference of the base electrode is detected to be as a level phase difference. Then the difference of the closest level phase differences of the non-base electrodes are detected to be as a most level phase difference. For example, the signal which is measured based on the level phase difference of the base electrode is used as a level signal. Then, the signal is gotten by measuring each phase difference of each set of the non-base driving electrode. The phase difference of the signal which is the closest one to the level signal is used as the level phase difference of the driving electrode which provides the driver signal. Thus, the level phase difference of each set of driving electrodes could be determined, and more level image could be obtained by delaying the following signal measurement based on the level phase differences of each set of driving electrodes, e.g. differences among signals in the image are very small. In addition, the level signal could be in a preset working range rather than a best or largest signal.

In the above-mentioned embodiment, when the driving signal is provided each time, all detecting electrodes are adopted the same phase difference. It can be appreciated by one with ordinary skill in the art that each set of detecting electrodes is separately adopted corresponding the closest phase difference of level phase difference when the driving signal is provided each time. In other words, when the driving signal is provided each time, signal measurement of each phase difference of each set of detecting electrodes is executed so as to determine the closest phase difference or the level phase difference.

Actually, the larger or the more level image could be obtained based on different amplification factors, impedances or measurement times except for delaying measurement by aberration.

Figure 10:
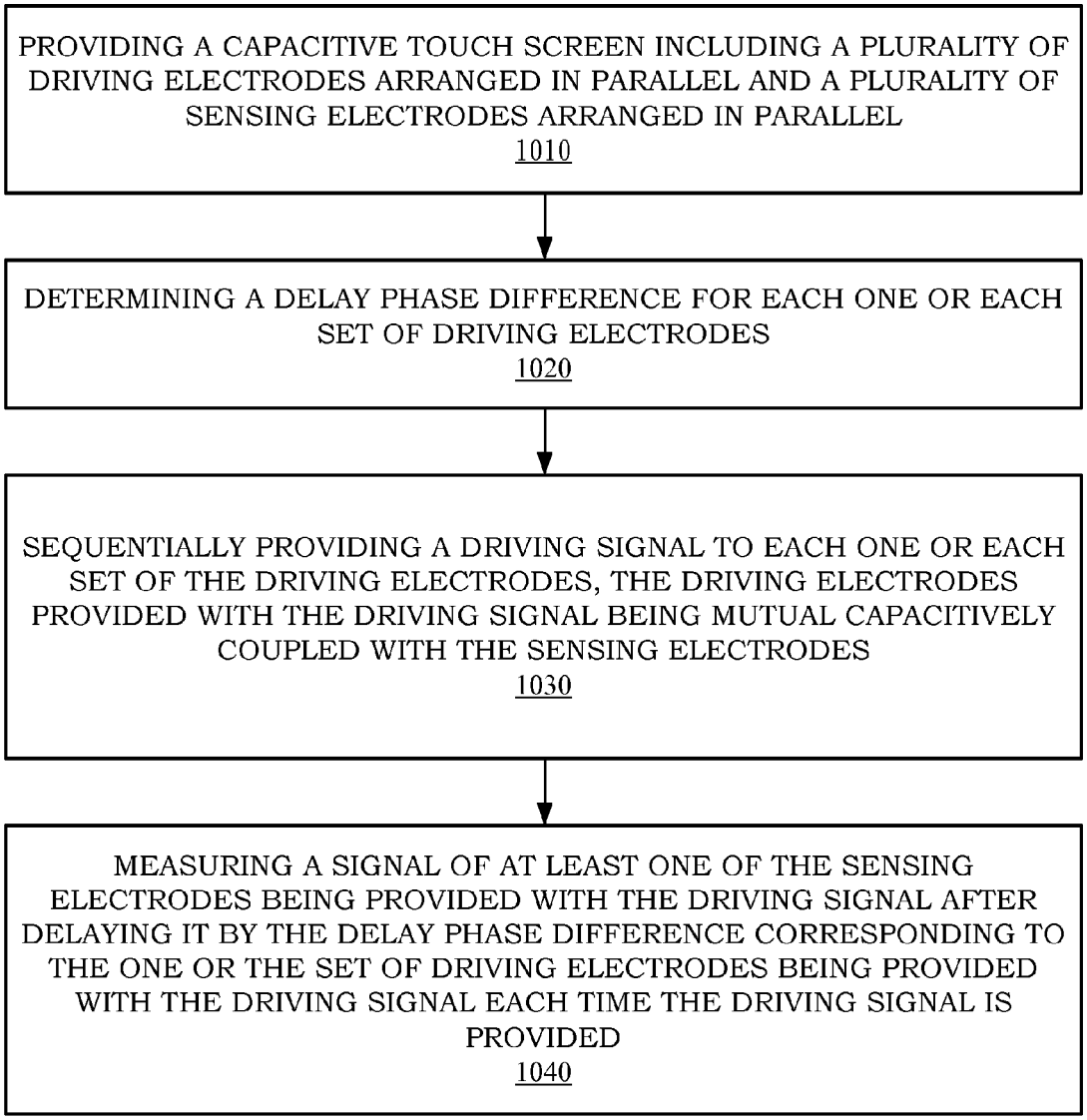
FIGS. 10 and 11 is a flowchart illustrating the detecting method of touch screen according to a first embodiment of the present invention.

Accordingly, the invention discloses a signal detecting method for touch screen, as shown in FIG. 10. In step 1010, a touch screen including a plurality of parallel driving electrodes and a plurality of parallel detecting electrodes is provided, wherein the driving electrodes and the detecting electrodes cross each other at intersections. In addition, in step 1020, a delay phase difference of each electrode or each set of electrodes is determined. Then, in step 1030, one and a set of driving electrodes among the plurality of driving electrodes is/ are provided with a driving signal in order, and the detecting electrodes are mutual capacitively coupled to the driving electrodes which the driving signal is provided to. Next, in step 1040, when the driving signal is provided each time, signals of each detecting combination which the driving signal is provided to is measured after delaying the corresponding phase difference.

Accordingly, in the signal detecting device for touch screen of the invention, the above-mentioned step 1030 could be executed by the driving circuit 41. In addition, the step 1040 could be executed by the detecting circuit 42.

In one embodiment of the invention, the delay phase difference of one driving electrode or one set of electrodes is selected from preset phase differences, e.g. the closest phase difference is selected. Each set of electrodes means one set of a plurality of electrodes which are provided the driving signal simultaneously when a plurality of electrodes are driven, e.g. it is executed by the driving selecting circuit 141 of the driving circuit 41. For example, one electrode or one set of electrodes of the driving electrodes is selected as the selected electrode in order, e.g. it is executed by driving circuit 41. Next, the delay phase difference of the selected electrode is selected from a plurality of preset phase differences, wherein when the driving signal is provided to the selected electrode, the signal which is measured after delaying the delay phase difference is larger than the signal which is measured after delaying other preset phase difference. For example, it is executed by the detecting circuit 42, and the detected delay phase difference could be stored in the storage circuit 43.

Furthermore, the level phase difference could be selected. For example, one driving electrode or one set of electrodes is selected as the base electrode, and other electrodes or other sets of electrodes are as non-base electrode, e.g. it is executed by the driving circuit 41. Next, the delay phase difference of the base electrode is selected from a plurality of preset phase differences. When the driving signal is provided to the base electrode, signals detected after delaying the delay phase difference are larger than signals detected after delaying preset phase differences. The delay phase difference is the level phase difference. The signal detected at the base electrode after delaying the delaying phase difference is as the base signal. Then, one electrode or one set of electrodes are selected as selected electrode in order, and the delay phase difference of the selected electrode is selected from the a plurality of preset phase differences, e.g. the most level phase difference, wherein when the driving signal is provided to the base electrode, signals measured after delaying the delay phase difference are closest to the level signal than signals measured after delaying preset phase differences. The above-mentioned embodiment could be executed by the detecting circuit 42.

In one embodiment of the invention, when the driving signal is provided to the base electrode or the selected electrode, signals measured from plurality of the detecting electrodes are the signals measured from one of the detecting electrodes. In other words, the delay phase difference is selected from the identical detecting electrode. In another embodiment of the invention, when the driving signal is provided to the base electrode or the selected electrode, signals measured from plurality of the detecting electrodes are sum of the signals measured from at least two detecting electrodes. In other words, the delay phase difference is selected from identical plurality or all of the detecting electrodes.

As above-mentioned, each intersection could be corresponding to a delay phase difference, wherein each one or each sets of driving electrodes and the detecting electrodes cross each other at intersections. Thereinafter, it is a detecting combination that each one or each sets of driving electrodes separately cross each one or each sets of detecting electrodes. In other words, the driving signal could be provided to one or a plurality of driving electrodes simultaneously, and signals could be measured by one or a plurality of detecting electrodes. When a signal is produced by measurement, one or a plurality of driving electrodes being provided the driving signal and one or a plurality of detecting electrodes be measuring are called as a detecting combination. For example, when single electrode or a plurality of electrodes are driven, a signal value is measured by one electrode; a differential value is measured by two electrodes; or a dual differential value is measured by three electrodes. The differential value is the difference between signals of two adjacent electrodes, and the dual differential value is the difference between the difference of the former two of three adjacent electrodes and the difference of the later two of three adjacent electrodes.

Figure 11:
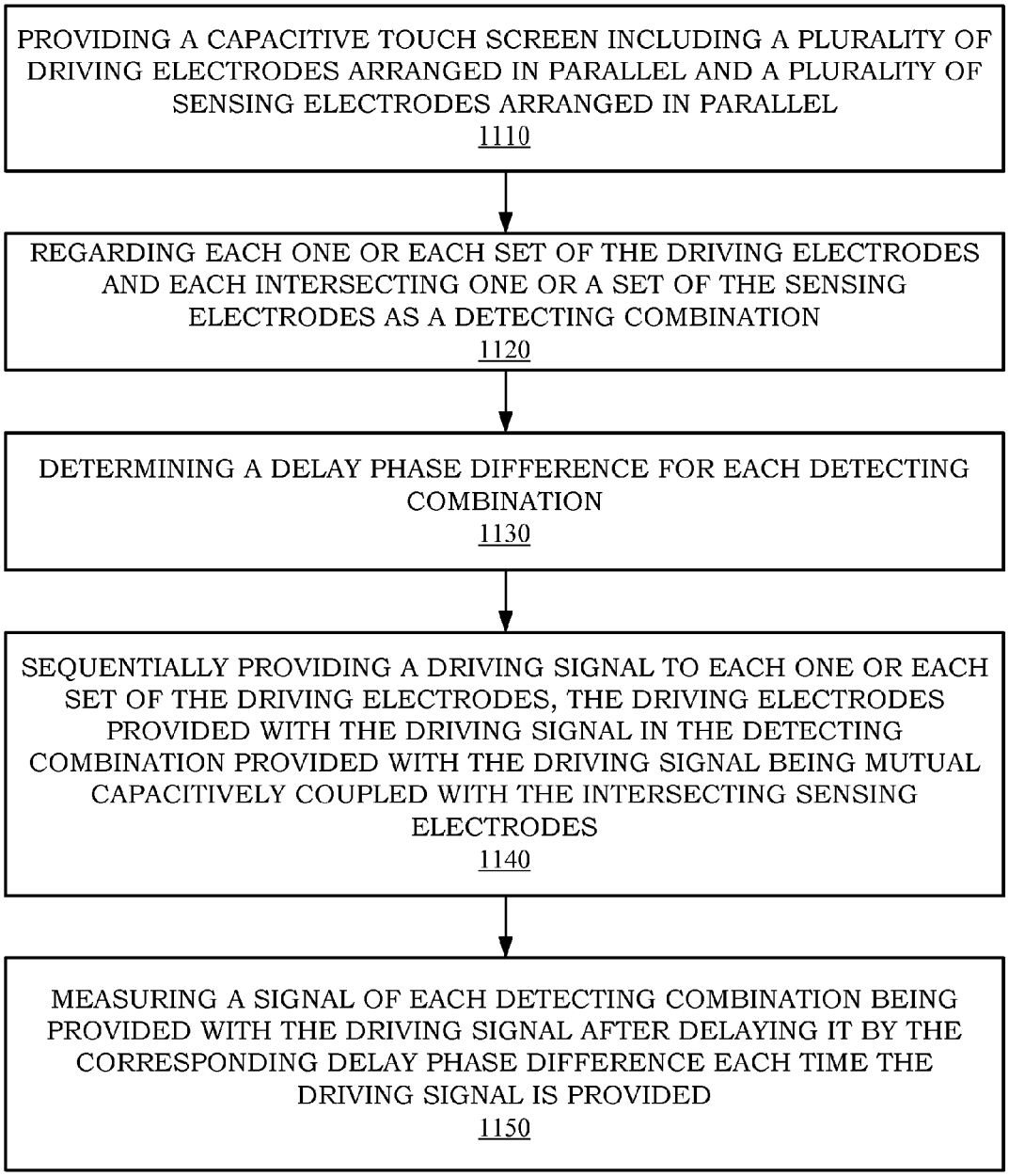

Accordingly, another embodiment of the invention is a signal detecting method for touch screen, shown as FIG. 11. In step 1110, a touch screen is provided, wherein the touch screen includes a plurality of parallel driving electrodes and a plurality of parallel detecting electrodes, and the driving electrodes and the detecting electrodes cross each other at intersections. Furthermore, in step 1120, it is a detecting combination that each one or each sets of driving electrodes separately cross each one or each sets of detecting electrodes. In step 1130, a delay phase difference of a detecting combination is determined. Then, in step 1140, one or one set of driving electrodes are provided a driving signal on order, wherein the driving electrode, which is provided the driving signal, in the detecting combination is capacitively coupled to the detecting electrodes which cross the driving electrode, Next, in step 1150, when the driving signal is provided, signals of each detecting combination which is provided driving signal is measured after delaying the corresponding phase difference.

Accordingly, in the signal detecting device of the invention, the step 1140 could be executed by the driving circuit 41, and the step 1150 could be executed by the detecting circuit 42.

In one embodiment of the invention, the step 1130 could include: one of the detecting combinations could be selected in order to be as the selected detecting combination, which the could be executed by the driving circuit 41; and the delay phase difference of the selected detecting combination is selected from a plurality of preset phase difference, wherein when the driving signal is provided to the selected detecting combination, the signal which is measured after delaying the delay phase difference is larger than the signal which is measured after delaying other preset phase difference, which could be executed by the detecting circuit 42.

In another embodiment of the invention, the delay phase difference of each detecting combination could further be determined by the following specifications. One of the detecting combinations is selected as a base detecting combination, other detecting combinations are as non-base detecting combinations, and one of the non-base detecting combinations are selected in order as the selected detecting combination, which are executed by the driving circuit 41. In addition, the delay phase difference of base detecting combination is selected from the a plurality of preset phase differences, wherein when the driving signal is provided to the base electrode, signals detected after delaying the delay phase difference are larger than signals detected after delaying preset phase differences, and signals detected after the delay phase difference is delayed by the base detecting combination is as a base signal. Further, the delay phase difference of selected detecting combination is selected from the a plurality of preset phase differences, wherein when the driving signal is provided to the selected detecting combination, signals measured after delaying the delay phase difference are closest to the level signal than signals measured after delaying preset phase differences. The above-mentioned embodiment could be executed by the detecting circuit 42.

In one second embodiment of the invention, signals are measured by a control circuit, and signals of each detecting electrode are measured via a variable resistor, wherein the impedance of the variable resistor is controlled by the control circuit based on each set of driving electrodes. For example, one set of the driving electrodes could be selected as the base electrodes firstly, and others of the electrodes are called the non-base electrodes. At first, a plurality of preset impedances are set, and when one or more base electrodes are provided the driving signal, signals of one detecting electrode are measured, or sum of the plurality or all of detecting electrodes are measured as a level signal. In addition, the level signal could be within a preset working range rather than the best or largest signal. In other words, any preset impedance which can make the level signal within the preset working range could be the level impedance of the base electrode. Next, when each set of the non-base electrodes are provided the driving signal, the variable resistor is adjusted based on each preset impedance. The signal of the detecting electrode is measured or sum of the plurality or all of detecting electrodes are measured so as to find out the preset impedance which is closest to the level signal, and the preset impedance is as the level impedance corresponding to the set of the non-base electrode which is provided the driving signal. Thus, the level impedance of the driving electrodes could be determined, and the impedance of the variable resistor could be adjusted based on the level impedance of each set of the driving electrodes (the variable resistor is adjusted to the level impedance) so as to obtain the more level image, i.e. differences among signals of the image are small.

In the above-mentioned description, when the driving signal is provided each time, all detecting electrodes are used the same level impedance. It can be appreciated by one with ordinary skill in the art that when the driving signal is provided each time, each set of the detecting electrodes are used separately the corresponding level impedances. In other words, when the driving signal is provided each time, signal is measured by separately detecting each preset impedance of each set of detecting electrodes so as to determine the preset impedance which is closest to the level signal. Accordingly, when the driving signal is provided to each set of the driving electrodes, the level impedance of each detecting electrode is separately obtained so as to adjust the impedance of the variable resistor which is electrically coupled to each detecting electrode.

The control circuit could consist of one or more ICs except electrical elements. In one embodiment of the invention, the variable resistor could be built in the IC, and the impedance of the variable resistor is control by the programmable program (e.g. firmware in the IC). For example, the variable resistor consists of a plurality of resistors and is controlled by a plurality of switches. The impedance of the variable resistor is adjusted by on and off of different switches. Since the variable resistors and such program are well-known in the art, they will not be further described herein. The program for controlling the variable resistors in the IC chip can be altered through firmware modifications in order to accommodate touch panels with different characteristics, thereby effectively reducing cost and achieving commercial mass production.

In a third embodiment of the invention, signals are measured by a control circuit. Signals of each set of detecting electrodes are measured via a detecting circuit (e.g. a integrator), and the control circuit controls the amplification factor of the detecting circuit based on each set of driving electrodes. For example, one set of the driving electrodes are selected as the base electrode, and other electrodes are called as non-base electrodes. At first, a plurality of preset impedances are set, and when one or more base electrodes are provided the driving signal, signals of one detecting electrode are measured, or sum of the plurality or all of detecting electrodes are measured as a level signal. In addition, the level signal could be within a preset working range rather than the best or largest signal. In other words, any preset impedance which can make the level signal within the preset working range could be the level impedance of the base electrode. Next, when each set of the non-base electrodes are provided the driving signal, the detecting circuit is adjusted based on each preset amplification factor. The signal of the detecting electrode is measured or sum of the plurality or all of detecting electrodes are measured so as to find out the preset amplification factor which is closest to the level signal, and the preset amplification factor is as the level amplification factor corresponding to the set of the non-base electrode which is provided the driving signal. Thus, the level amplification factor of the driving electrodes could be determined, and the amplification factor of the detecting circuit could be adjusted based on the level amplification factor of each set of the driving electrodes so as to obtain the more level image, i.e. differences among signals of the image are small.

In the above-mentioned description, when the driving signal is provided each time, all detecting electrodes are used the same level amplification factor. It can be appreciated by one with ordinary skill in the art that when the driving signal is provided each time, each set of the detecting electrodes are used separately the corresponding level amplification factors. In other words, when the driving signal is provided each time, signal is measured by separately detecting each preset amplification factor of each set of detecting electrodes so as to determine the preset amplification factor which is closest to the level signal. Accordingly, when the driving signal is provided to each set of the driving electrodes.

In a forth embodiment of the invention, signals are measured by a control circuit. Signals of each set of detecting electrodes are measured via a detecting circuit (e.g. a integrator), and the control circuit controls the measurement time of the detecting circuit based on each set of driving electrodes. For example, one set of the driving electrodes are selected as the base electrode, and other electrodes are called as non-base electrodes. At first, a plurality of preset measurement times are set, and when one or more base electrodes are provided the driving signal, signals of one detecting electrode are measured, or sum of the plurality or all of detecting electrodes are measured as a level signal. In addition, the level signal could be within a preset working range rather than the best or largest signal. In other words, any preset impedance which can make the level signal within the preset working range could be the level measurement time of the base electrode. Next, when each set of the non-base electrodes are provided the driving signal, the detecting circuit is adjusted based on each preset measurement time. The signal of the detecting electrode is measured or sum of the plurality or all of detecting electrodes are measured so as to find out the preset measurement time which is closest to the level signal, and the preset measurement time is as the level measurement time corresponding to the set of the non-base electrode which is provided the driving signal. Thus, the level measurement time of the driving electrodes could be determined, and the measurement time of the detecting circuit could be adjusted based on the level measurement time of each set of the driving electrodes so as to obtain the more level image, i.e. differences among signals of the image are small.

In the above-mentioned description, when the driving signal is provided each time, all detecting electrodes are used the same level measurement time. It can be appreciated by one with ordinary skill in the art that when the driving signal is provided each time, each set of the detecting electrodes are used separately the corresponding level measurement times. In other words, when the driving signal is provided each time, signal is measured by separately detecting each preset measurement time of each set of detecting electrodes so as to determine the preset measurement time which is closest to the level signal. Accordingly, when the driving signal is provided to each set of the driving electrodes, the level measurement time of each detecting electrode is separately obtained so as to adjust the impedance of the variable resistor which is electrically coupled to each detecting electrode.

In the above-mentioned specification, one or any mixture of the first, second, third and forth embodiments could be executed, the present invention is not limited as such. In addition, when measuring the level signal, the level signal could be produced by measuring one or more detecting electrodes which are farthest from the detecting electrode. For example, the level signal could be produced by measuring the electrode which is farthest from the detecting electrode, or the level signal (differential value) could be produced by measuring the differential signal between two electrodes which are farthest from the detecting electrode, or the level signal (dual differential value) could be produced by measuring the difference between the former two of three electrodes which are farthest from the detecting electrode and the later two of three electrodes which are farthest from the detecting electrode. In other words, the level signal could be the signal value, the differential value or the dual differential value, or could be the value produced based on signals of one or more detecting electrodes.

Figure 12:
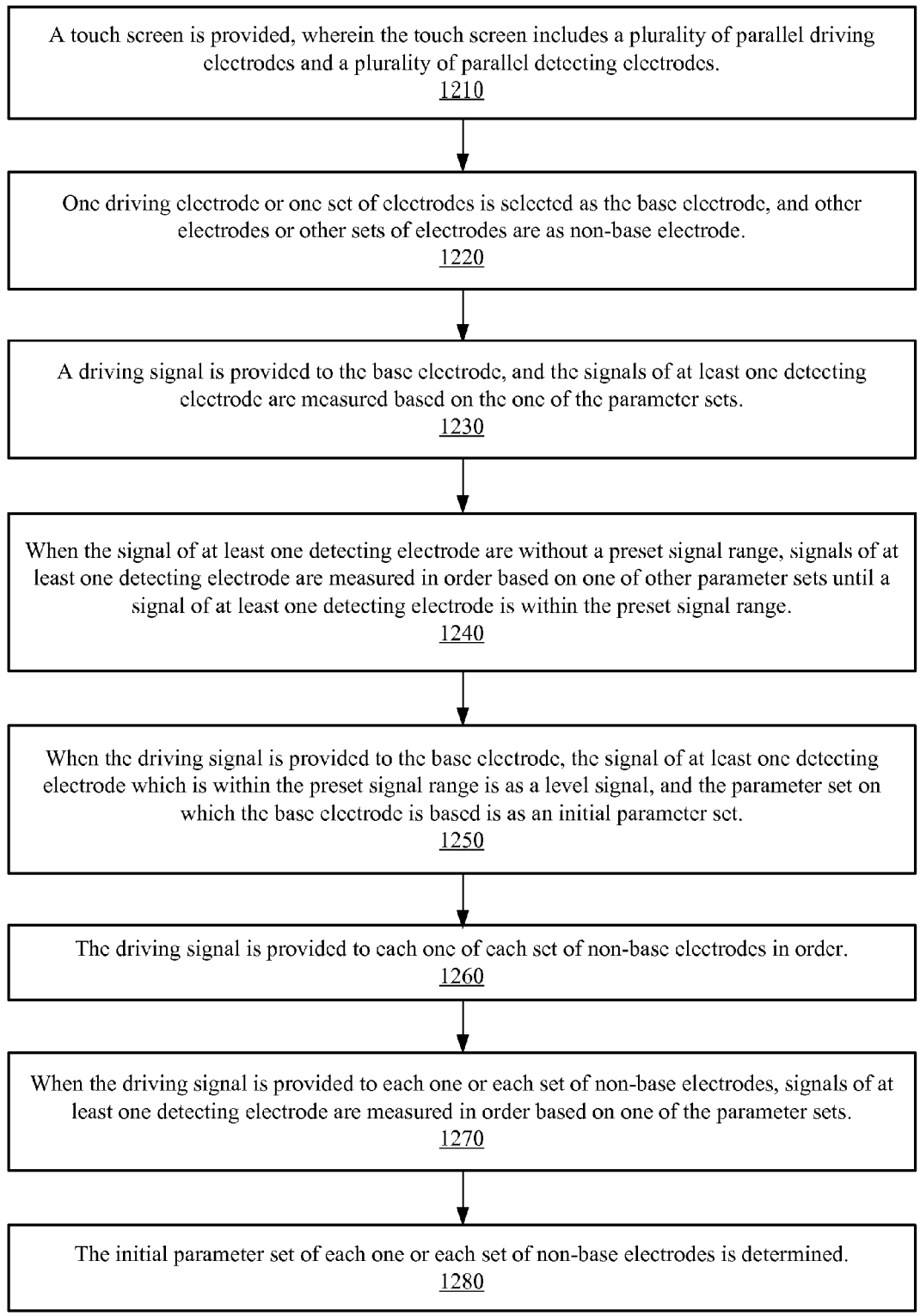
FIG. 12 is a flowchart illustrating the detecting method of touch screen according to another embodiment of the present invention.

Please refer to FIG. 12, a signal detecting method for touch screen is disclosed. In step 1210, a touch screen is provided, wherein the touch screen includes a plurality of parallel driving electrodes and a plurality of parallel detecting electrodes, and the driving electrodes and the detecting electrodes cross each other at intersections. In step 1220, one driving electrode or one set of electrodes is selected as the base electrode, and other electrodes or other sets of electrodes are as non-base electrode. The base electrode could be the electrode or the set of driving electrodes at the first position (intersection) or the driving electrode at any other position (intersection), the present invention is not limited as such. Then, in step 1230, a driving signal is provided to the base electrode, and the signals of at least one detecting electrode are measured based on the one of the parameter sets. In step 1240, when the signal of at least one detecting electrode are without a preset signal range, signals of at least one detecting electrode are measured in order based on one of other parameter sets until a signal of at least one detecting electrode is within the preset signal range. In addition, in step 1250, when the driving signal is provided to the base electrode, the signal of at least one detecting electrode which is within the preset signal range is as a level signal, and the parameter set on which the base electrode is based is as an initial parameter set. Then, in step 1260, the driving signal is provided to each one of each set of non-base electrodes in order, and in step 1270, when the driving signal is provided to each one or each set of non-base electrodes, signals of at least one detecting electrode are measured in order based on one of the parameter sets. Next, in step 1280, the initial parameter set of each one or each set of non-base electrodes is determined, wherein the driving signal is provided separately to each one or each set of non-base electrodes, and the signal of at least one detecting electrode detected based on the initial parameter set is the closest level signal than the signals of at least one detecting electrode detected based on other parameter sets.

According to the first, second, third and forth embodiments, the parameter sets could be used to change the delay phase difference, the impedance of the variable resistor, the amplification factor and the measurement time of the detecting circuit. In a first example of the invention, the driving signal passes through a variable resistor to at least one detecting electrode, wherein the impedance of the variable resistor is changed based on the initial parameters be provided the driving signal. In a second example of the invention, time of the detecting signal is changed based on the initial parameters of the electrodes being provided the driving signal. In a third example of the invention, the driving signal is provided to at least one detecting electrode after amplified by an amplifier, wherein the amplification factor of the amplifier is changed based on the initial parameters of the electrodes be provided the driving signal. In addition, in a forth example, the signal of at least one detecting signal is started to be measured after a delay phase difference, wherein the delay phase difference is changed based on the initial parameters of the electrode being provided the driving signal.

Figure 4:
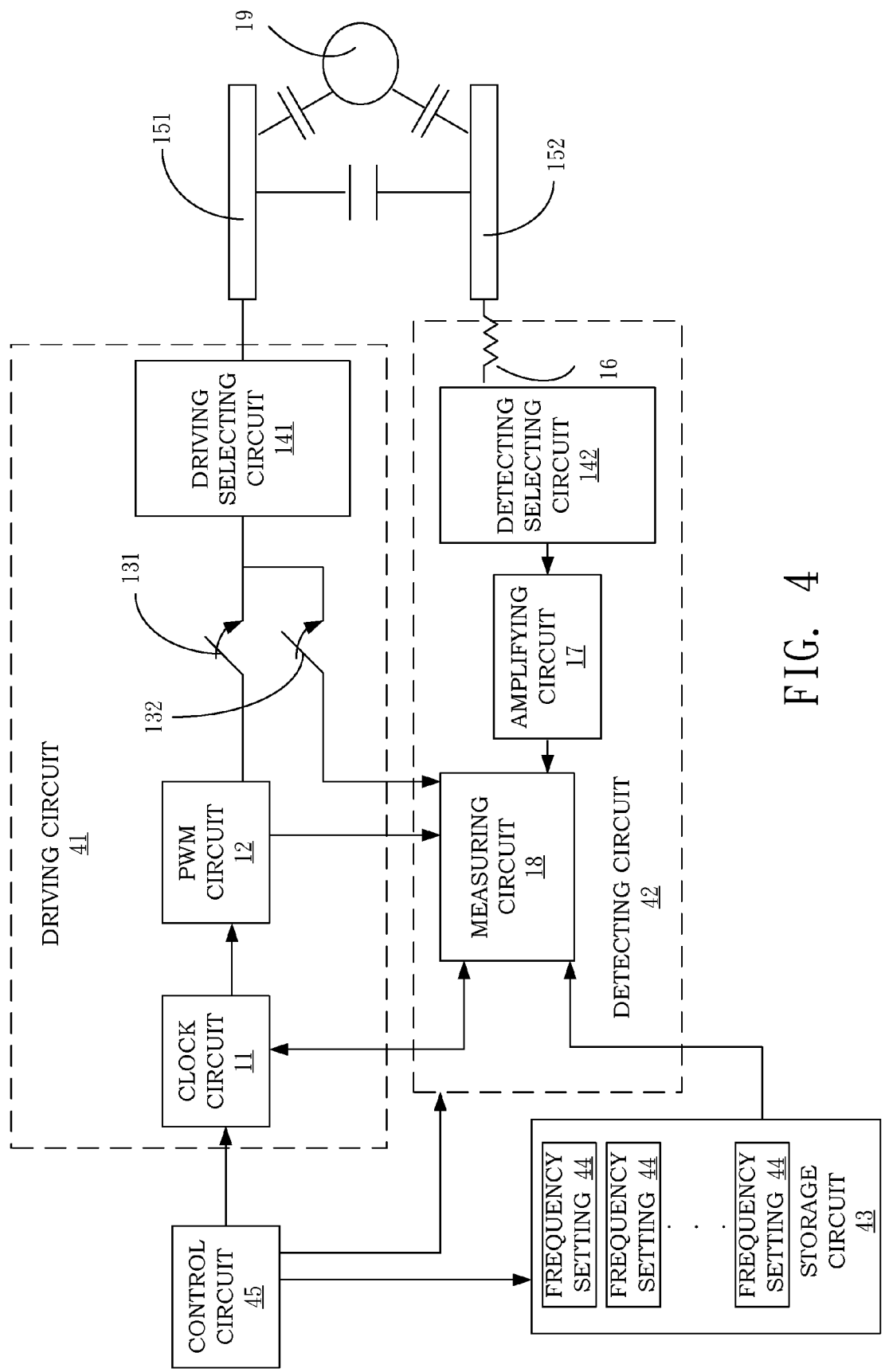

Accordingly, please refer to FIG. 4, the signal measurement of one kind of touch screen based on this invention including a touch screen, a driving circuit 41, a detecting circuit 42, and a controlling circuit 45. The electrodes in the touch screen is consist of several parallel arranged driving electrodes 151 and several parallel arranged detecting electrodes 152, and these two kinds of electrodes overlap in several cross-stack area. Driving circuit 41 provide a driving signal to one or one set of driving electrode 151 which will be used as base electrode, and the others will be non-base electrode. Every time when driving signal is provided, the detecting circuit 42 will base on one of the parameter sets to produce an evaluated signal from the signal of at least one detecting electrode 152 to the driving electrode 151 receiving driving signal. Controlling circuit 45 picks one of the parameter set as initial parameter set of base electrode. The evaluated signal, which is produced by detecting circuit based on the initial parameter set, is used as a level signal. The initial parameter set of every one or every set of the non-base electrode is picked from the mentioned parameter set, and the evaluated signal of every one or every set of the non-base electrode based on the initial parameter set is the closet one to the level signal comparing to other evaluated signal produced by other parameter set. Additionally, the mentioned parameter set cab be stored in stored circuit 43.

Evaluated signal can be produced according to the signal of one or more detecting electrode. For instance, evaluated signal is produced by the mentioned detecting electrode. Another example is that the evaluated signal is produced by the sum of the signal of at least two mentioned detecting electrode.

In addition, one of the examples of this invention, the control circuit controls the detecting circuit to produce the evaluated signal of the base electrode produced based on one of the parameter sets in order, and the parameter set producing the largest evaluated signal of base electrode is designated as the initial parameter set of the base electrode by the control circuit. Another example in this invention, the control circuit controls the detecting circuit to produce the evaluated signal of the base electrode based on one of the parameter sets in order, and the parameter set, on which the evaluated signal of the base electrode firstly conforms to a condition based, is designated as the initial parameter set of the base electrode by the control circuit.

According to the previous four embodiments, the parameter set can used to change delay phase difference, resistance value of variable resistor, amplification factor of detecting circuit, and measuring time of detecting circuit. The first example in this invention, the driving signal is transported through one variable resistor to at least one detecting electrode. The detecting circuit changes its resistance value of variable resistor by the initial parameter of electrode receiving driving signal. The second example in this invention, the detecting circuit changes its detecting duration by the initial parameter of the electrode receiving driving signal. The third example in this invention, driving signal is amplified by a amplifier, and provided to at least one detecting electrode. The detecting circuit changes amplification factor by the initial parameter of electrode receiving driving signal. Additionally, the fourth example in this invention, the signal of at least one of the detecting electrodes in detecting circuit is measured after one delay phase difference. The detecting circuit changes delay phase difference by the initial parameter of electrode receiving driving signal.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A detection system for touch screen, comprising:
   a touch screen comprising a plurality of parallel driving electrodes and a plurality of parallel detecting electrodes, wherein the driving electrodes and the detecting electrodes cross each other at intersections;
   a driving circuit, providing a driving signal to one driving electrode or one set of driving electrodes, wherein one driving electrode or one set of driving electrodes are designated as one base electrode or one set of base electrodes, and the others of the driving electrodes not receiving the driving signal are not designated as base electrodes;
   a detecting circuit, by signals of at least one detecting electrode, generating an evaluated signal for the driving electrodes, to which the driving signal is provided, based on one of a plurality of parameter sets when the driving signal is provided each time; and
   a control circuit selects one of the parameter sets as an initial parameter set of the base electrode so as to designate the evaluated signal, which is produced by detecting circuit based on the initial parameter set, as a level signal, and the initial parameter set of each one or each set of the non-base electrode is selected from the mentioned parameter set, wherein the evaluated signal of each one or each set of the non-base electrode based on the initial parameter set is the closest one to the level signal comparing to other evaluated signals produced by other parameter sets.

2. The detection system of claim 1, wherein the control circuit controls the detecting circuit to produce the evaluated signal of the base electrode produced based on one of the parameter sets in order, and the parameter set producing the largest evaluated signal of base electrode is designated as the initial parameter set of the base electrode.

3. The detection system of claim 1, wherein the control circuit controls the detecting circuit to produce the evaluated signal of the base electrode based on one of the parameter sets in order, and the parameter set, on which the evaluated signal of the base electrode firstly conforms to a condition based, is designated as the initial parameter set of the base electrode.

4. The detection system of claim 1, wherein the evaluated signal is produced from one of the detecting electrodes.

5. The detection system of claim 1, wherein the evaluated signal is produced from the sum of at least two of the detecting electrodes.

6. The detection system of claim 1, wherein the driving signal passes through a variable resistor to at least one detecting electrode, wherein the impedance of the variable resistor is changed based on the initial parameters be provided the driving signal.

7. The detection system of claim 1, wherein the detecting circuit changes the detecting duration based on the initial parameter of the electrode receiving the driving signal.

8. The detection system of claim 1, wherein the driving signal is provided to at least one detecting electrode after amplified by an amplifier, wherein the amplification factor of the amplifier is changed by the detecting circuit based on the initial parameters of the electrodes be provided the driving signal.

9. The detection system of claim 1, wherein the signal of at least one of the detecting electrodes in detecting circuit is measured after one delay phase difference, wherein the detecting circuit changes delay phase difference by the initial parameter of electrode receiving driving signal.

10. A detecting method for touch screen, comprising:
providing a touch screen, wherein the touch screen includes a plurality of parallel driving electrodes and a plurality of parallel detecting electrodes, and the driving electrodes and the detecting electrodes cross each other at intersections;
selecting one driving electrode or one set of electrodes as the base electrode, and other not selected electrodes or other not selected sets of electrodes as non-base electrode;
providing a driving signal to the base electrode, and measuring the signals of at least one detecting electrode based on the one of the parameter sets;
measuring signals of at least one detecting electrode in order based on one of other parameter sets until a signal of at least one detecting electrode is within the preset signal range when the signal of at least one detecting electrode are without a preset signal range;
designating the signal of at least one detecting electrode which is within the preset signal range as a level signal, and the parameter set on which the base electrode is based is as an initial parameter set when the driving signal is provided to the base electrode;
providing the driving signal to each one or each set of non-base electrodes in order;
measuring signals of at least one detecting electrode in order based on one of the parameter sets when the driving signal is provided to each one or each set of non-base electrodes; and
determining the initial parameter set of each one or each set of non-base electrodes, wherein the driving signal is provided separately to each one or each set of non-base electrodes, and the signal of at least one detecting electrode detected based on the initial parameter set is the closest level signal than the signals of at least one detecting electrode detected based on other parameter sets.

11. The detecting method of claim 10, wherein the driving signal passes through a variable resistor to at least one detecting electrode, wherein the impedance of the variable resistor is changed based on the initial parameters be provided the driving signal.

12. The detecting method of claim 10, wherein the detecting duration is changed based on the initial parameter of the electrode receiving the driving signal.

13. The detecting method of claim 10, wherein the driving signal is provided to at least one detecting electrode after amplified by an amplifier, wherein the amplification factor of the amplifier is changed by the detecting circuit based on the initial parameters of the electrodes be provided the driving signal.

14. The detecting method of claim 10, wherein the signal of at least one of the detecting electrodes in detecting circuit is measured after one delay phase difference, wherein the detecting circuit changes delay phase difference by the initial parameter of electrode receiving driving signal.

* * * * *